(12) United States Patent
George et al.

(10) Patent No.: US 10,985,993 B2
(45) Date of Patent: Apr. 20, 2021

(54) IDENTIFYING AUDIENCES THAT CONTRIBUTE TO METRIC ANOMALIES

(71) Applicant: Adobe Inc., San Jose, CA (US)

(72) Inventors: William Brandon George, Pleasant Grove, UT (US); James Meyer, Spanish Fork, UT (US); John Bates, Highland, UT (US)

(73) Assignee: ADOBE INC., San Jose, CA (US)

( * ) Notice: Subject to any disclaimer, the term of this patent is extended or adjusted under 35 U.S.C. 154(b) by 451 days.

(21) Appl. No.: 14/855,655

(22) Filed: Sep. 16, 2015

(65) Prior Publication Data

US 2017/0076202 A1    Mar. 16, 2017

(51) Int. Cl.
*H04L 12/24* (2006.01)
*G06N 5/04* (2006.01)
*G06N 5/00* (2006.01)

(52) U.S. Cl.
CPC .......... *H04L 41/142* (2013.01); *G06N 5/045* (2013.01); *G06N 5/003* (2013.01)

(58) Field of Classification Search
CPC ....... H04L 41/142; G06N 5/045; G06N 5/003
USPC ....................................................... 709/224
See application file for complete search history.

(56) References Cited

U.S. PATENT DOCUMENTS

| | | | | |
|---|---|---|---|---|
| 2004/0015329 A1* | 1/2004 | Shayegan | ............... | G06F 19/00 702/179 |
| 2006/0075094 A1* | 4/2006 | Wen | .................... | H04L 63/1408 709/224 |
| 2007/0011039 A1* | 1/2007 | Oddo | .................... | G06F 21/316 705/7.33 |
| 2009/0265784 A1* | 10/2009 | Waizumi | ............ | H04L 63/1458 726/23 |
| 2009/0299695 A1* | 12/2009 | Subbu | .................. | G05B 23/024 702/181 |
| 2009/0300769 A1* | 12/2009 | Srinivasa | ............ | H04L 63/1416 726/26 |
| 2010/0027432 A1* | 2/2010 | Gopalan | ............... | H04L 41/142 370/252 |
| 2010/0083055 A1* | 4/2010 | Ozonat | ............... | G06F 11/0709 714/47.2 |
| 2011/0119374 A1* | 5/2011 | Ruhl | ...................... | G06Q 10/06 709/224 |
| 2012/0137367 A1* | 5/2012 | Dupont | ................... | G06F 21/00 726/25 |
| 2012/0215903 A1* | 8/2012 | Fleischman | ........ | G06Q 30/0201 709/224 |

(Continued)

*Primary Examiner* — Umar Cheema
*Assistant Examiner* — Tony Williams
(74) *Attorney, Agent, or Firm* — Keller Jolley Preece

(57) ABSTRACT

The present disclosure is directed toward systems and methods for identifying contributing audience segments associated with a metric anomaly. One or more embodiments described herein identify contributing factors based on statistical analysis and machine learning. Additionally, one or more embodiments identify audience segments associated with each contributing factor. In one or more embodiments, the systems and methods provide an interactive display that enables a user to select a particular anomaly for further analysis. The interactive display also provides additional interfaces through which the user can view informational displays that illustrate the factors and segments that caused the particular anomaly and how those factors correlate with each other.

20 Claims, 11 Drawing Sheets

(56) References Cited

U.S. PATENT DOCUMENTS

| | | | |
|---|---|---|---|
| 2013/0117852 A1* | 5/2013 | Stute | G06F 21/55 726/23 |
| 2014/0040180 A1* | 2/2014 | Ruhl | G06F 16/958 706/52 |
| 2014/0108640 A1* | 4/2014 | Mathis | H04L 41/145 709/224 |
| 2014/0164398 A1* | 6/2014 | Smith | G06F 17/3053 707/748 |
| 2014/0324758 A1* | 10/2014 | Diaz | G06N 5/048 706/52 |
| 2015/0033086 A1* | 1/2015 | Sasturkar | G06F 16/26 714/57 |
| 2015/0121518 A1* | 4/2015 | Shmueli | H04L 63/1425 726/22 |

* cited by examiner

IDENTIFYING AUDIENCES THAT CONTRIBUTE TO METRIC ANOMALIES

CROSS REFERENCE TO RELATED APPLICATIONS

N/A

BACKGROUND

1. Technical Field

One or more embodiments described herein relate generally to enhancing analytical performance. More specifically, one or more embodiments relate to identifying contributing audiences associated with a metric anomaly.

2. Background and Relevant Art

Network users access millions of websites daily for a variety of purposes. Network users access websites for purposes such as commerce, information, and entertainment. In fact, it is not uncommon for network users to conduct a large portion of their daily tasks (e.g., shopping, news, recipes, exercise) via various websites. Additionally, users access networks to transfer files, submit search queries, upload pictures and other electronic media, send social network posts, or to utilize various "web-enabled" devices. Users utilize various network connections and servers to perform these tasks, in addition to countless other tasks.

In light of widespread and daily network usage, administrators and marketers generally perform data analytics in association with actions performed by various network users in connection with one or more websites or client applications. Occasionally, data analytics reveals anomalies associated with a particular type of user action performed in connection with a website, web page, or client application. For example, an anomaly can comprise an unexpected increase or decrease associated with a particular type of user action performed in connection with a website or application. To illustrate, a webpage may include an embedded video that, for the last month, web page visitors have played an average of 10 times a day. Then, one day, web page visitors play the embedded video 50 times. This increase in the number of times web page visitors play the embedded video is generally considered an anomaly because it is an outlier compared to the expected number of plays.

While administrators and marketers can generally identify an anomaly with ease, determining why the anomaly occurred is typically a complex and time consuming task. For example, in response to identifying an anomaly associated with a decrease in the number of website visitors who land on a particular web page within the website, a website administrator generally has to run dozens or even hundreds of reports and queries in order to identify the factors that contributed to the decrease. It may take days, if not weeks, for the website administrator to run and review the results of these reports and queries in order to determine that, for example, the decrease in the number of website visitors who land on the particular webpage was due to factors including a loss of website traffic from a particular search engine (e.g., perhaps due to a change in the website's search engine optimization related to that search engine), and a loss of web traffic from a particular geographic region (e.g., perhaps due to a change in a marketing campaign focused on that particular geographic region). Accordingly, the process of determining an anomaly's contributing factors is typically compared not just to finding a needle in a haystack, but to finding a needle in hundreds of haystacks. While the end result is somewhat informative, the process of determining an anomaly's contributing factors is generally considered too exhausting, time-consuming, expensive, and complicated for most administrators and marketers.

Similarly, identifying specific audiences of visitors/users who caused the anomaly is also a typically complex and time consuming task. For example, in response to identifying an anomaly associated with an increase in the number of website visitors who open a particular article on a news web page, a website administrator's first question is generally "who are the website visitors who contributed to this anomaly?" In order to answer this question, the administrator generally has to run dozens or even hundreds of reports and queries in order to identify the factors that contributed to the increase. Once the administrator has identified the contributing factors, the administrator must perform further analysis in order to identify audiences of website visitors who are associated with the contributing factors.

Thus, there are several disadvantages to current methods for identifying factors and audiences that contribute to anomalies related to user actions across a network.

SUMMARY

One or more embodiments described herein provide benefits and/or solve one or more of the foregoing or other problems in the art with systems and methods that allow for efficient and effective identifying of audiences who contribute to analytic anomalies. For example, one or more embodiments involve identifying one or more anomalies associated with a variety of user actions. Additionally, one or more embodiments, in response to a user selecting one of the identified anomalies, identify factors and audiences that contributed to the selected anomaly by querying large quantities of data from a central or distributed repository. Additionally, one or more embodiments involve utilizing the identified factors to generate audience segments. Each audience segment can represent a group of users who likely contributed in a significant way to the anomaly. A network administrator or marketer can use the generated audience segments to target the particular users associated with the identified anomaly.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which.

DETAILED DESCRIPTION

Figure 1:
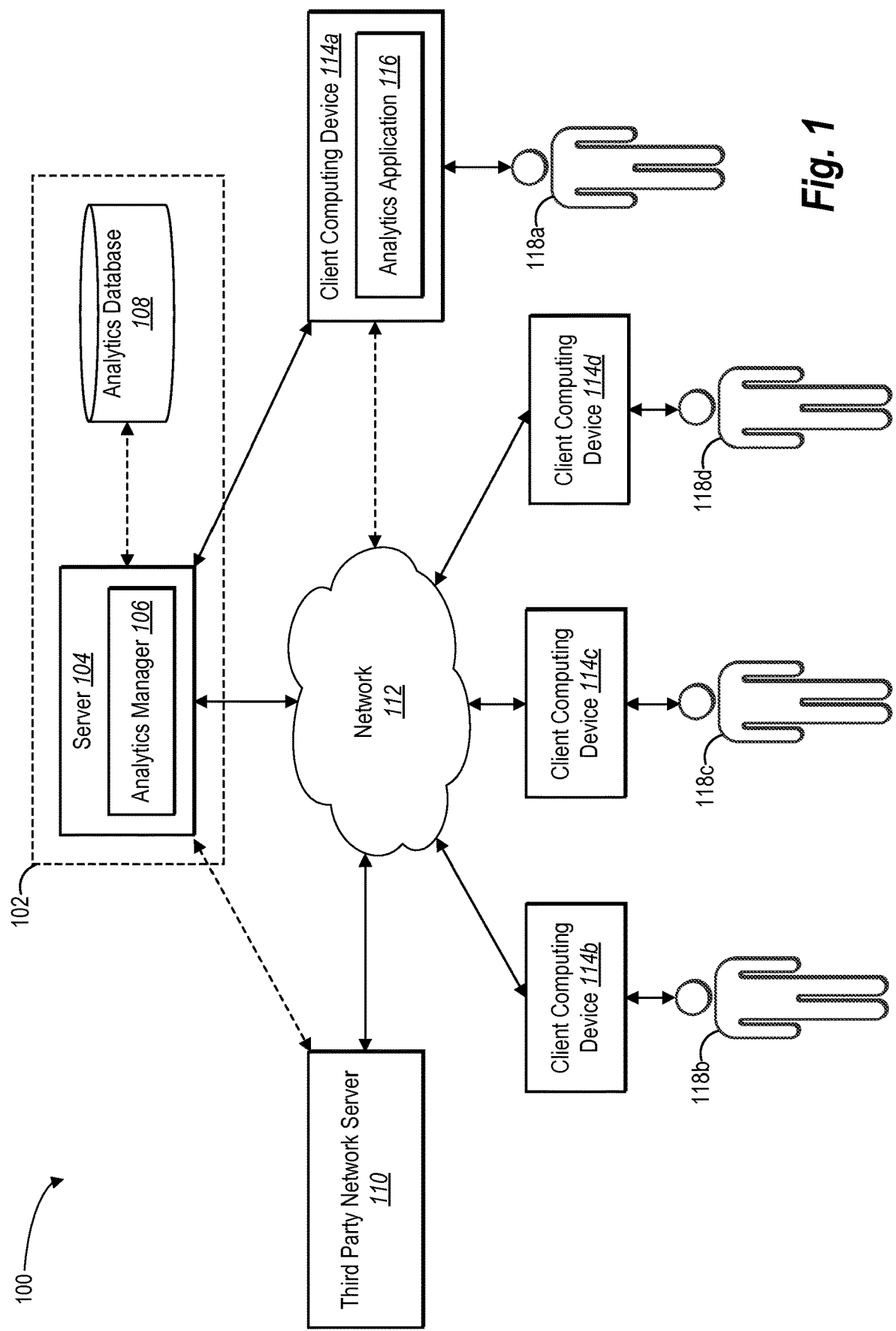
FIG. 1 illustrates a block diagram of an environment for implementing an analytics system in accordance with one or more embodiments.

One or more embodiments described herein include an analytics system that identifies anomalies within data associated with user actions in a network environment. For example, an analytics system of one or more embodiments described herein identifies anomalies by comparing current data related to a particular type of user action against a set of training data, historical data, trend data, or data averages that predicts the performance of that particular type of user action. In one or more embodiments, the analytics system provides an interactive display that enables a user to select a particular anomaly for further analysis. The interactive display not only allows the user to select a particular anomaly for analysis, but also provides additional interfaces through which the user can view informational displays that illustrate the factors that caused the particular anomaly and how those factors correlate with each other.

To illustrate, in one or more embodiments and in response to a user selecting a particular anomaly from the interactive display for further analysis, the analytics system identifies one or more factors and audience segments that contributed in a statistically significant way to the selected anomaly. For example, in response to receiving the user input selecting the particular anomaly, the analytics system queries data from a central repository, and runs statistical calculations and machine learning on the queried data to identify one or more factors and audience segments that contributed significantly to a selected anomaly. One or more embodiments described herein also calculate and assign a contribution score for each identified factor that indicates the strength of each factor's contribution to the identified anomaly. In at least one embodiment, the analytics system can also normalize the calculated contribution scores, such that they can easily be compared to each other in a displayed report.

To further illustrate, the analytics system can provide a user with an interactive display that shows a trend of expected user actions related to a particular website, overlaid with a trend of observed user actions related to the particular website. In one or more embodiments, area where the observed trend moves outside the expected trend, a user can easily see where a website anomaly has occurred. In response to the user selecting a point on the observed trend that represents an anomaly, the analytics system retrieves large amounts of data associated with a time period associated with the selected anomaly from a central repository that stores data associated with the website. The analytics system proceeds to utilize statistical analysis and machine learning on the retrieved data in order to identify one or more factors that statistically contributed to the occurrence of the selected anomaly. The analytics system described herein identifies audiences of users (e.g., segments) who likely contributed in a statistically significant way to an identified anomaly. For example, once the analytics system receives a selection of a particular anomaly and identifies one or more contributing factors for that anomaly, the analytics system generates audience segments associated with the combination of the top contributing factors of the anomaly. In one or more embodiments, the analytics system analyzes each generated segment to determine which of the segments contributed to the anomaly most significantly. Finally, the analytics system generates and provides reports and visualizations (e.g., trend plots, hierarchical trees, scatter plots, etc.) that help the user understand how each identified factor contributed to the selected anomaly.

Furthermore, the analytics system described herein can provide additional granularity by identifying contributing sub-factors for each of the identified one or more factors. Each identified sub-factor associated with a particular factor can contribute to the particular factor in various ways. Accordingly, in at least one embodiment, the analytics system calculates contribution scores for sub-factors relative to their associated factors, thus providing an indication of which sub-factors contributed most strongly to a particular factor. In one or more embodiments, the analytics system provides analytics data and reports related to the contributing factors and sub-factors in various interactive displays.

Thus, one or more embodiments determines seemingly hidden patterns within data to explain statistical anomalies and identify correlations behind unexpected customer actions, out-of-bounds values, and sudden spikes or dips for selected metrics. For example, the analytics system identifies contributing factors associated with a particular anomaly that may not seem related to the anomaly in a meaningful way (e.g., a change to an advertisement campaign related to a website in one geographic area may affect website traffic from users in a different geographic area). Furthermore, one or more embodiments allows for immediate and prompt data analysis to discover why an anomaly happened. More particularly, one or more embodiments can perform complex statistical analysis on a sample set of data (e.g., data from a limited portion of database or distributed storage). Based on the statistical analysis on the sample set of data, the analytics system can identify potential factors that contributed to the anomaly. Once the potential factors are identified, the analytics system can query the entire data set for information about the potential factors. Thus, the analytics system can break down contributions to an anomaly in seconds or minutes compared to weeks.

The analytics system can help develop a narrative for customer interactions. Furthermore, the analytics system can strategically identify and capture meaningful associations to develop new audience segments or tactically identify out-of-bound or fraudulent activity that triggers an alert. Furthermore, the analytics system can provide interactive visualizations designed to give varying perspectives to help answer why anomaly happened and what to do about the anomaly.

Term Descriptions (in Addition to Dictionary Meaning of the Terms)

As used herein, an "anomaly" refers to a statistically significant change within trend data associated with a particular aspect of a network application. For example, a website may experience an anomaly when web traffic to a particular page within the website suddenly increases beyond average or expected numbers. Other anomalies can include, but are not limited to changes in how often a link is clicked, how often a video is viewed, how often a product is purchased, etc. As another example, an anomaly in a web metric can include an unexpected decrease in page views of a web page, or an unexpected increase in revenue generated by the website. In addition, an "anomaly period" is representative of a time duration in which the anomaly is observed, such as a one or more hours, days, weeks, and so on.

As used herein, a "metric" refers to user actions or other measurable attributes that may occur within a network environment, such as a web page or native application. Some examples of metrics include, but are not limited to, web page lands, video completes, link clicks, revenue generated by the website, number of units sold, number of prior visits by visitors, number of clicks by visitors, number of logins, length of visits, etc. Metrics generally are user or other actions that lead to anomalies. For example, by measuring a link click metric associated with a link on a particular web page, the analytics system can identify an anomalous increase in the number of times the link is clicked in a 24-hour period.

As used herein, a "factor" (also referred hereinto as a "dimension") is representative of a categorical variable associated with a web metric. Some examples of dimensions include a country of a visitor to the website, various demographics of the visitor, a browser type used by the visitor to access the website, an operating system used by the visitor when accessing the website, referring websites, demographic and/or geographic information about a visitor, and so on.

As used herein, a "contributing factor" is any factor that leads to an identified anomaly. For example, if a particular web page within a website experiences an anomalous increase in web traffic over a 24-hour period, contributing factors to the anomalous increase in web traffic may include a new advertisement campaign recently launched by the website, a new search engine optimization technique utilized by the website, etc. Any identified anomaly may have numerous contributing factors, and each contributing factor may have a different level of contribution to the identified anomaly.

As used herein, the terms "sub-factor," "dimension element," or simple "element" refers to a particular occurrence that directly contributes to a factor. Sub-factors can be representative of values associated with a corresponding dimension. For example, in the example detailed above, a sub-factor associated with a new advertisement campaign can be a particular demographic targeted by the new advertisement campaign. Any identified contributing factor may have numerous contributing sub-factors, and each sub-factor may have a different level of contribution to the associated contributing factor.

As used herein, a network application refers to computer software that causes one or more computing devices to perform useful tasks and that is supported by or uses a network (e.g., the Internet) to preform a portion of the useful tasks. Examples of network applications include websites, desktop computing applications (e.g., native applications for personal computers or laptops), and mobile applications (e.g., native applications for phones and tablets).

Figure 2:
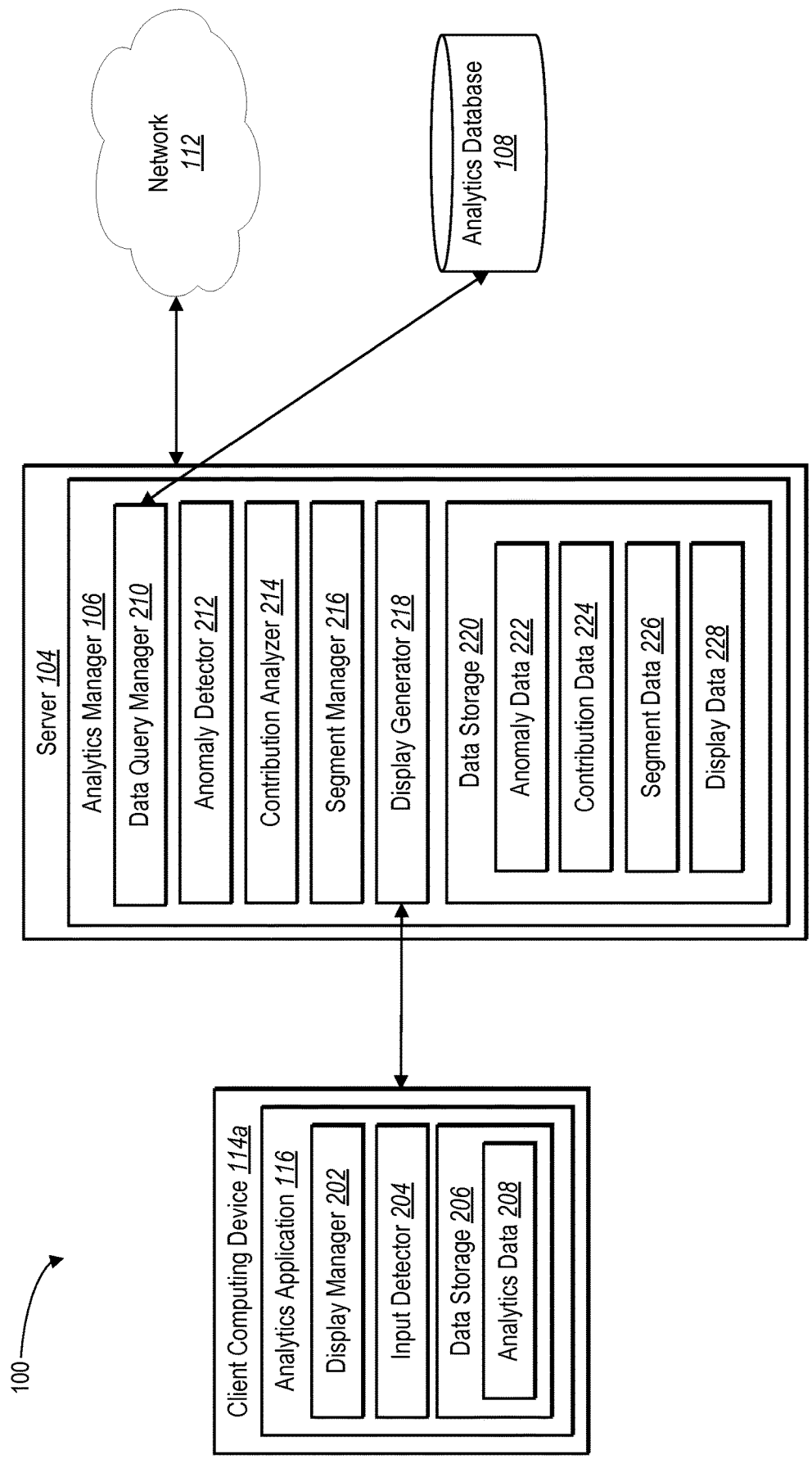
FIG. 2 illustrates a schematic diagram of the analytics system of FIG. 1 in accordance with one or more embodiments.

FIGS. 1 and 2 provide an overview of an analytics system environment and example architecture to provide context the analytics system and the methods for detecting factors that contribute to an anomaly. After providing an overview of the analytics system environment and example architecture details of the interactive visualizations and processing of the analytics system is described. FIG. 1 is a schematic diagram illustrating an analytics system 100 in accordance with one or more embodiments. As illustrated in FIG. 1, the analytics system 100 may include users 118a, 118b, 118c, and 118d, client-computing devices 114a, 114b, 114c, and 114d, a third-party network server 110 (e.g., a web server), and a network 112 (e.g., the Internet). As further illustrated in FIG. 1, the client-computing devices 114b-114d can communicate with the third-party network server 110 and the server 104 through the network 112. Although FIG. 1 illustrates a particular arrangement of the users 118a-118d, the client devices 114a-d, the network 112, the third-party network server 110, and the analysis system 100, various additional arrangements are possible. For example, the client devices 114b-114d may directly communicate with the third-party network server 110, bypassing the network 112.

While FIG. 1, illustrates four users 118a-d, the analytics system 100 can include more than four users. For example, the server 104 and the analytics manager 106 thereon may manage and query data representative of some or all of the users 118a-118d. Additionally, the analytics manager 106 may manage and query data representative of other users associated with the third-party network server 110. Furthermore, in one or more embodiments, the users 118b-118d can interact with the client-computing devices 114b-114d, respectively. Examples of client devices may include, but are not limited to, mobile devices (e.g., smartphones, tablets), laptops, desktops, or any other type of computing device. See FIG. 5 for additional information regarding client-computing devices.

Additionally, in one or more embodiments, the client-computing devices 114b-114d of the analytics system 100 can communicate with the third-party network server 110 through the network 112. In one or more embodiments, the network 112 may include the Internet or World Wide Web. The network 112, however, can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. The network 112 is further described with reference to FIG. 6 below.

In one or more embodiments, the client-computing devices 118b-118d may communicate with the third-party network server 110 for a variety of purposes. For example, the third-party network server 110 may be a web server, a file server, a server, a program server, etc. Thus, in one or more embodiments, the client-computing devices 114b-114d communicate with the third-party network server 110 for purposes such as, but not limited to, requesting a web page, uploading a file, updating a profile, downloading a game, and so forth. For example, in one embodiment the third-party network server 110 may be a web server for an ecommerce business. In that example, a user 118b may communicate with the web server by requesting web pages from the web server for display via a web browser operating on the client-computing device 114b-114d.

In one embodiment, the analytics system 100 can track and store various user data related to interactions between the client devices 114b-114d and the third-party network server 110. For example, the analytics system 100 may track user data including, but not limited to, user actions (i.e., URL requests, link clicks, mouse hovers, text inputs, video views, button clicks, etc.), time data (i.e., when a link was clicked, how long a user stayed on a webpage, when an application was closed, etc.), path tracking data (i.e., what web pages a user visits during a given session, etc.), demographic data (i.e., an indicated age of a user, an indicated gender of a user, an indicated socioeconomic status of a user, etc.), geographic data (i.e., where a user is located, etc.), and transaction data (i.e., the types of purchases a user makes, etc.), as well as other types of data. For instance, in one embodiment, the third-party network server 110 may be a webserver, and the client device 114b may communicate with the third-party network server 110 in order to request web page information so that a certain web page may be displayed to the user 118b via the client-computing device 114b. In that case, the analytics system 100 may track the user action (i.e., requesting the web page data), the time the action was performed, the geographic information associated with the client-computing device 114b (i.e., a geographic area associated with an IP address assigned to the client-computing device 114b), and/or any demographic data that may be associated with the user 118b.

The analytics system 100 can track and store user data in various ways. For example, in some instances, the third-party network server 110 may track user data. In one embodiment, the third-party network server 110 can track the user data and then report the tracked user data to an analytical server, such as the server 104 (i.e., via the dashed line illustrated in FIG. 1). In order to obtain the tracking data described above, the third-party network server 110 may utilize data stored on the client-computing device 114b-114d (i.e., a browser cookie), embed computer code (i.e., tracking pixels), initialize a session variable, access a user profile, or engage in any other type of tracking technique. Once the third-party network server 110 has tracked the user data, the third-party network server 110 may report the tracked user data to the server 104, as will be described in more detail below with reference to FIG. 2.

Alternatively or additionally, the server 104 may receive tracked user data directly from the client-computing devices 114b-114d. For example, the third-party network server 110 may install software code on the client-computing devices 114b-114d that causes the client devices 114b-114d to report user data directly to the server 104. Furthermore, in some embodiments the network 112 may also track user data and report the tracked user data to the server 104. Thus, the server 104 can receive tracked user data from the third-party network server 110, the network 112, and/or the client-computing devices 114b-114d.

Also illustrated in FIG. 1, the server 104 may be communicatively coupled) with an analytics database 108 (i.e. a central repository of data). In one or more embodiments, the server 104 may store tracked user data to, and query tracked user data from, the analytics database 108. In one embodiment, the analytics database 108 may be separately maintained from the server 104. Alternatively, in one embodiment, the server 104 and the analytics database 108 may be combined into a single device or collection of devices (e.g., as demonstrated by the box 102). In at least one embodiment, the analytics database 108 may be a series of remote databases controlled by a central manager.

For example, in one or more embodiments, the analytics database 108 may utilize a distributed architecture, wherein the analytics database 108 includes multiple storage devices that are not all connected to a common processing unit, but rather are controlled by a database management system. For instance, in one or more embodiments, the multiple storage devices of the analytics database 108 are dispersed over a network. Stored data may be replicated, fragmented, or partitioned across the multiple storage devices. In at least one embodiment, in response to a data query, the database management system of the analytics database 108 may return only a random sampling of data in order to save on processing time and resources. Alternatively or additionally, in response to a data query, the database management system of the analytics database 108 may return a full data set.

Furthermore, as shown in FIG. 1, the analytics system 100 may include a client-computing device 114a that operates an analytics application 116. In one or more embodiments, a user 118a may be a network administrator who queries analytics data from the server 104 via the client-computing device 114a. In one embodiment, the server 104 may provide various graphical user interface controls and displays to the analytics application 116 at the client-computing device 114a in order to help the user 118a perform data analysis. Additionally, the server 104 may receive and process requests from the analytics application 116, and provide analysis results based on the received requests. This process is described in greater detail below with reference to FIGS. 2 and 3A-3F.

FIG. 2 illustrates a schematic diagram illustrating an example embodiment of the analytics system 100. As shown, the analytics system 100 may include, but is not limited to, the server 104 communicatively coupled to the network 112, the analytics database 108, and the client-computing device 114a. The server 104 can include the analytics manager 106, which in turn includes, but is not limited to, a data query manager 210, an anomaly detector 212, a contribution analyzer 214, a segment manager 216, a display generator 218, and a data storage 220. Although the disclosure herein shows the components 210-220 to be separate in FIG. 2, any of the components 210-220 may be combined into fewer components, such as into a single facility or module, or divided into more components as may serve one or more embodiments. In addition, the components 210-220 may be located on, or implemented by, one or more computing devices, such as those described below in relation to FIG. 5.

Additionally, the analytics system 100 includes the client-computing device 114a running an analytics application 116. As shown in FIG. 2, the analytics application 116 may include, but is not limited to, a display manager 202, an input detector 204, and a data storage 206. In general, the analytics system 100 can allow a user of the client-computing device 114a to utilize the server 104 and the analytics manager 106 thereon to query and analyze data. Additionally, the analytics system 100 can allow a user of the client-computing device 114a to receive analysis results from the analytics manager 106 via the analytics application 116.

The components 202-220 can comprise software, hardware, or both. For example, the components 202-220 can comprise computer instructions stored on a non-transitory computer-readable storage medium and executable by at least one processor of the client-computing device 114a. When executed by the at least one processor, the computer-executable instructions can cause the client-computing device 114a or the server 104 to perform the methods and processes described herein. Alternatively, the components 202-220 can comprise hardware, such as a special purpose processing device to perform a certain function or group of functions. Additionally or alternatively, the components 202-220 can comprise a combination of computer-executable instructions and hardware.

In one or more embodiments, the analytics application 116 can be a native application installed on the client-computing device 114a. For example, the analytics application 116 may be a mobile application that installs and runs on a mobile device, such as a smart phone or a tablet. Alternatively, the analytics application 116 can be a personal computing device application, widget, or other form of a native computer program. Alternatively, the analytics application 116 may be a remote application that the client-computing device 114a accesses. For example, the analytics application 116 may be a web application that is executed within a web browser of the client-computing device 114a.

As mentioned above, and as shown in FIG. 2, the analytics application 116 can include a display manager 202. The display manager 202 can provide, manage, and/or control a graphical user interface (or simply "user interface") that allows a user to perform analysis and receiving information from the analytics manager 106. For example, the display manager 202 can provide a user interface that facilitates interactions with a display. Likewise, the display manager 202 can provide a user interface that displays analyses received from the analytics manager 106.

More specifically, the display manager 202 may facilitate the display of a user interface (e.g., by way of a display device associated with the client-computing device 114a). For example, the user interface may be composed of a plurality of graphical components, objects, and/or elements that allow a user to interact with the analytics manager 106. More particularly, the display manager 202 may direct the client-computing device 114a to display a group of graphical components, objects and/or elements as directed by the analytics manager 106, as will be described further below.

As further illustrated in FIG. 2, the analytics application 116 can include an input detector 204. In one or more embodiments, the input detector 204 can detect, receive, and/or facilitate user input in any suitable manner. In some examples, the input detector 204 can detect one or more user interactions with respect to the user interface. As referred to herein, a "user interaction" means a single interaction, or combination of interactions, received from a user by way of one or more input devices.

For example, the input detector 204 can detect a user interaction from a keyboard, mouse, touch pad, touch screen, and/or any other input device. In the event the client-computing device 114a includes a touch screen, the input detector 204 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The input detector 204 may additionally, or alternatively, receive data representative of a user interaction. For example, the input detector 204 may receive one or more user configurable parameters from a user, one or more user commands from the user, and/or any other suitable user input. The input detector 204 may receive input data from one or more components of the analytics application 116, from the storage on the client-computing device 114a, or from one or more remote locations (e.g., the analytics manager 106).

The analytics application 116 can perform one or more functions in response to the input detector 204 detecting user input and/or receiving other data. Generally, a user can control, navigate, and otherwise use the analytics application 116 by providing one or more user inputs that the input detector 204 can detect. For example, in response to the input detector 204 detecting user input, one or more components of the analytics application 116 allow the user to view data, interact with analysis controls, or submit analysis requests. In addition, in response to the input detector 204 detecting user input, one or more components of the analytics application 116 allow a user to navigate through one or more user interfaces to build or configure an analysis request.

In one or more embodiments, in response to the input detector 204 detecting one or more user inputs, the analytics application 116 can facilitate the analytics manager 106 in assisting the user in configuring an analysis request. For example, a user may provide input (e.g., via a button click, a list item selection, etc.) indicating an anomaly on which the user would like an analysis performed. In response to the input detector 204 detecting the input, the analytics manager 106 can begin analysis of the selected anomaly.

Also as mentioned above, and as illustrated in FIG. 2, the analytics application 116 may also include a data storage 206. The data storage 206 can store and maintain analytics data 208 representative of anomaly information, contributing factor information, predictive information, historical trend information, segment data, etc. In one or more embodiments, a user of the analytics application 116 can search, review, export, or share the information within the data storage 206.

As mentioned above, and as shown in FIG. 2, the server 104 can include the analytics manager 106. The analytics manager 106 can handle, process, configure, and perform all analyses required in determining factors and audience segments that contribute to metric anomalies within a network environment. Additionally, the analytics manager 106 can configure and provide a variety of displays that illustrate analysis results as well as how identified factors and audience segments perform relative to a metric anomaly.

Also as mentioned above, the analytics manager 106 includes a data query manager 210. In one or more embodiments, the data query manager 210 can query and receive data from the analytics database 108. For example, as mentioned above, in some embodiments, in response to a data query, the analytics database 108 may return a random sample of data items that are representative of a whole data set. In that case, the analytics manager 106 can perform one or more analyses on the random data set to identify metric anomalies, contributing factors, and contributing audience segments. Additionally, in at least one embodiment, the data query manager 210 can identify a whole data set that corresponds to a random sample of data items.

More particularly, in one or more embodiments the analytics database 108 comprises a plurality of distributed servers. In one or more embodiments, upon receiving a request for a contribution analysis report, the analytics manager 106 can query a small sampling of the servers. The analytics manager 106 can then process the data returned from the small sampling of servers to identify factors that appear to contribute to the anomaly. Once the a set of potential factors are identified, the analytics manager 106 can query a large amount or all of the servers in the plurality of distributed servers for the data related to the set of potential factors. In this manner the analytics manager 106 can quickly analyze and determine the contributing factors to an anomaly (i.e., in a manner of second or minutes rather than days or weeks).

In one or more embodiments the analytics manager 106 performs tens of millions of queries against the data set. Then the analytics manager 106 applies machine learning to identify which factors statistically contribute to the anomaly. More particularly, the analytics manager 106 can query eVars, props (including pathing—enter/exit), out-of-the box variables, SAINT classifications, customer attributes, social data, video data, mobile data, target based survey data, any other data that exists. The analytics manager 106 then applies the machine learning statistical test to identify across the data if is there a subset that helps explain the anomaly.

Furthermore, the data query manager 210 can maintain and utilize various data reports. In one or more embodiments, the data query manager 210 queries data from the analytics database in accordance with various data reports. For example, each data report can include queries that instruct the analytics database 108 on data items that should be returned. In at least one embodiment, the data query manager 210 can maintain and utilize hundreds, thousands, or even millions of data reports in connection with the analytics database 108. Additionally or alternatively, the analytics database 108 may store the data reports, and the data query manager 210 may simply instruct the analytics database 108 on which reports to run. As mentioned above, the data query manager 210 can run the maintained data reports against a random sampling of data related to a particular query rather than running the maintained data reports against all data related to the particular query in order to save time and processing power. Additionally or alternatively, the data query manager 210 can first run the maintained data reports against a random sampling of data related to a particular query in order to identify the most relevant data before running the maintained data reports again against the identified relevant data.

The data query manager 210 can also organize and store the results of one or more data reports. For example, as described above, the data query manager 210 and/or the analytics database 108 can process one or more data reports, which in turn return some number of data results. Accordingly, in one or more embodiments, the data query manager 210 can receive and organize the returned data results. In at least one embodiment, the data query manager 210 can organize returned data results chronologically, topically, or based on any other characteristic suitable for organizing data.

Also as illustrated in FIG. 2, the analytics manager 106 also includes the anomaly detector 212. As mentioned above, metrics within a network environment occasionally experience unexpected increases and/or decreases in frequency. As used herein, a "metric" refers to user actions that may occur within a network environment, such as a web page or application. Some examples of metrics include, but are not limited to, web page lands, video completes, link clicks, etc.

For example, users may play a particular video on a web page an average of 10 times a day, only to one day play the video 100 times. This unexpected increase in the frequency of the "video completes" metric on that web page may or may not be an anomaly, depending on whether the increase is statistically significant. In one or more embodiments, the anomaly detector 212 can not only identify increases and decreases in the frequency of a wide range of metrics, the anomaly detector 212 can also determine if a particular increase or decrease in a metric is statistically significant, thus making the increase or decrease in a particular metric an anomaly for that metric.

The anomaly detector 212 can identify increases and decreases in a particular metric by first querying training data via the data query manager 210. For example, in order to determine whether the current metric has increased or decreased, the anomaly detector 212 can query training data related to the metric for a certain time period. In some embodiments, the training data time period can be the past 30, 60, or 90 days. The training data time period can be configurable or user selectable.

In response to an established training data time period, the anomaly detector 212 can query data associated with the metric for the training data time period via the data query manager 210. For example, if the particular metric is "video completes" and the training data time period is 30 days, the anomaly detector 212 can cause the data query manager 210 to process every existing data report associated with video completes on data that the analytics database 108 has for last 30 days. At this point, the anomaly detector 212 can perform a simple comparison to determine whether the current video completes metric has increased or decreased over the average frequency associated with the metric in question within the training data.

Next, in order to determine whether the current increase or decrease associated with a metric is statistically significant, and thus an anomaly, the anomaly detector 212 can run a predictive analysis on the training data. In one or more embodiments, the predictive analysis can involve determining an expected range associated with a metric. For example, on an average day, a web page may experience 10 video completes, but the expected range associated with the video completes metric can be plus or minus a certain amount. Thus, the anomaly detector 212 may determine that an increase or decrease in video completes by 1 or 2 video completes would not be statistically significant. In some embodiments, the anomaly detector 212 may determine that the expected range associated with a metric is within approximately 95% of the observed metric value.

Furthermore, the anomaly detector 212 can run a predictive analysis on the training data to determine an expected metric value. In one or more embodiments, the predictive analysis can determine an expected metric value by recognizing data trends associated with the metric and using machine learning to project those trends. For example, if a web page has experienced 9-11 video completes per day for the last 14 days, the predictive analysis may determine that the web page will likely continue to experience approximately 10 video completes on day 15.

The anomaly detector 212 can also determine whether an increased or decreased metric value is statistically significant, thus making the metric value anomalous. In one or more embodiments, the anomaly detector 212 can determine whether a metric value is statistically significant based on whether the metric value is outside the expected range for that particular and/or based on whether the metric value is in line with the expected metric value within the data trend, as described above. The anomaly detector 212 can further determine whether a metric value is anomalous based on other statistical analysis and/or machine learning. Anomaly detection is further described in U.S. patent application Ser. No. 13/651,176, filed Oct. 12, 2012, which is incorporated by reference herein in its entirety.

As mentioned above, and as illustrated in FIG. 2, the analytics manager 106 can also include a contribution analyzer 214. Once the anomaly detector 212 has determined that a particular metric value is an anomaly, the contribution analyzer 214 can identify one or more factors that contributed to the anomalous metric value. In one or more embodiments, every metric (i.e., every possible user action such as hyperlink clicks, video completes, page lands, etc.) can be associated with one or more associated factors. For example, for a metric such as video completes, associated factors can include gender of users who watched the video, operating systems utilized by users who watched the video, search engines that referred users to the web page where they watched the video, age of users who watched the video, geographic location of users who watched the video, previous web pages visited by users who watched the video, etc. By determining which factors contributed the most to a metric anomaly, the analytics manager 106 can help a web manager understand why the anomaly occurred. Understanding why the anomaly occurred can allow a web manager to correct undesirable anomalies or reproduce positive anomalies.

Accordingly, the contribution analyzer 214 can identify one or more factors that contributed to an anomalous metric value by first querying all data related to the metric anomaly. In one or more embodiments, the contribution analyzer 214 can do this by causing the data query manager 210 to run every data report on the analytics database 108 that is associated with the anomalous metric. In at least one embodiment, the contribution analyzer 214 can apply machine learning to the data set returned from the analytics database 108 to determine which factors statistically contributed to the identified anomaly. For instance, in one embodiment, the contribution analyzer 214 can compare data associated with a particular factor at the time of the anomaly against training data for the same factor. Accordingly, the contribution analyzer 214 can detect whether a particular factor accounted for a statistical contribution to an anomaly. Additional or alternative methods for identifying contributing factors associated with a particular anomaly are described in U.S. patent application Ser. No. 14/526,149, filed Oct. 28, 2014, which is incorporated by reference herein in its entirety.

In particular, the contribution analyzer 214 can

Furthermore, the contribution analyzer 214 can apply other or additional statistical analysis to a particular factor in determining that factor's statistical significance. For example, in one embodiment, the contribution analyzer 214 can perform a "Pearson residual" calculation to determine a factor's statistical significance. Broadly, the Pearson residual calculation determines how well an observed value is predicted by a model. Accordingly, if the contribution analyzer 214 calculates a high Pearson residual for a factor in view of the training data associated with that factor, the factor was most likely a statistically significant contributor to the anomaly.

Regardless of how the contribution analyzer 214 determines a factor's statistical significance in relation to an anomaly, the contribution analyzer 214 can normalize the statistical significance of each factor related to the anomaly. For example, as mentioned above, if the contribution analyzer 214 utilizes Pearson residuals in determining the statistical significance of a group of factors, the results of those calculations would be difficult to compare because each factor's Pearson residual is factor-specific. Thus, in at least one embodiment, the contribution analyzer 214 can normalize the statistical significance of each factor such that all statistically significant factors can be compared side-by-side.

In one or more embodiments, the contribution analyzer 214 can normalize the statistical significance of two or more factors by performing a "Cramer's V" calculation. For example, the Cramer's V calculation is a measure of association between two variables. In at least one embodiment, the contribution analyzer 214 can utilize Cramer's V to normalize the statistical significance of all factors associated with an anomaly between −1 and 1. Accordingly, as the normalized statistical significance of a particular factor moves closer to 1, the factor shows a stronger association with an anomaly representing a metric spike or increase. Similarly, as the normalized statistical significance of a particular factor moves closer to −1, the factor shows a stronger association with an anomaly representing a metric dip or decrease. In one or more embodiments, the normalized statistical significance of a particular factor is also referred to as that factor's "contribution score."

Furthermore, the contribution analyzer 214 can also identify sub-factors that contribute in a statistically significant way to an anomaly. In one or more embodiments, every factor associated with an anomaly can be associated with sub-factors. For example, as mentioned above, search engines that referred a user to a web page containing a video may be a contributing factor to an anomaly associated with the metric "video completes." In order to add more specificity and granularity to the contribution analysis, the contribution analyzer 214 can identify sub-factors (i.e., specific search engines) within the general search engine factor. In one or more embodiments, the contribution analyzer 214 can identify the sub-factors of a particular factor by querying all data associated with the particular factor and utilizing machine learning and statistical analysis.

Additionally, the contribution analyzer 214 can determine how a particular sub-factor contributes to the contribution score of its associated factor. For instance, in the video completes example used above, one particular search engine may refer more users to the web page containing the video than all the other search engines captured in the search engine factor. Accordingly, the sub-factor associated with the particular search engine contributed more heavily to the search engine factor's contribution score than the other search engines sub-factors.

The contribution analyzer 214 can also rank, order, or organize factors and sub-factors based on contribution scores. For example, in one or more embodiments, the contribution analyzer 214 can rank factors based on how close each factor's contribution score is to 1 or −1. As described above, as a factor's contribution score approaches 1 or −1, the contribution analyzer 214 determines that the factor contributes more greatly as a cause of the metric anomaly. Accordingly, the contribution analyzer 214 can rank the factors such that the factors having the greatest contribution to the metric anomaly are ranked highest.

As mentioned above, and as illustrated in FIG. 2, the analytics manager 106 can also include a segment manager 216. In one or more embodiments, factors that contributes to a metric anomaly is associated with an audience of users. For example, as mentioned above, the gender of a user who completes a video view is a factor that can contribute to an anomaly in the video complete metric. Accordingly, each user of a particular gender (e.g., either male or female) who completes a video view grows the audience associated with the corresponding "gender" factor by one. In one or more embodiment, the segment manager 216 can track audience percentages associated with factors and sub-factors.

Furthermore, the segment manager 216 can generate audience segments based on the factors associated with a metric anomaly having the highest contribution scores. For example, in one or more embodiments, the audiences associated with the factors having high contribution scores are likely to be the users whose actions caused the metric anomaly. It is also helpful to know, however, whether the audiences associated with the contributing factors have any overlap. In other words, it is helpful to know whether a single group of users are members of audiences of more than one contributing factor. Accordingly, the segment manager 216 can generate audience segments based on combinations of the factors with the highest ranked contribution scores.

In order to generate audience segments based on combinations of top contributing factors, the segment manager 216 can first identify a specific number of top contributing factors. For example, as mentioned above, the contribution analyzer 214 may identify all factors associated with a metric anomaly that are statistically significant. Accordingly, the contribution analyzer 214 can even identify and display factors that have very low contribution scores. As such, the contribution analyzer 214 may identify as many as one hundred contributing factors for a particular metric anomaly. In one or more embodiments and in order to identify an audience segment that contributed significantly to a metric anomaly, the segment manager 216 may focus on only a small number (i.e., five or less) of the contributing factors with the highest contribution scores. In at least one embodiment, generating audience segments based on a small number of contributing factors also helps maintain shorter computation times for the analytics manager 106.

Next, the segment manager 216 can construct unique, non-singular combination of the top number of contributing factors. In one or more embodiments, if the segment manager 216 identifies three top contributing factors "X," "Y," and "Z" associated with a particular metric anomaly, the segment manager 216 constructs four unique, non-singular combinations of those top contributing factors. For example, the segment manager 216 can construct "XY," "XZ," "YZ," and "XYZ." In light of the fact that the segment manager 216 is looking for overlaps between the audiences associated with top contributing factors, the order of the factors in the constructed unique, non-singular combinations does not matter (i.e., the combination "XY" would have the same overlap as the combination "YX").

Once the segment manager 216 has constructed a number of unique, non-singular combinations of top contributing factors, the segment manager 216 can query data associated with the "segment" represented by each combination of top contributing factors. As used herein a "segment" refers to a subgroup of a set of users (i.e., an audience) who each have performed at least one of the user activities represented by the top contributing factors represented within a combination of top contributing factors. For example, the contribution analyzer 214 may identify top contributing factors for a particular anomaly that include "Gender: Male," "Registration Type: Anonymous," and "Referrer Type: Search Engine." Accordingly, the segment manager 216 can construct the combination of that includes the factors "Gender: Male" and "Referrer Type: Search Engine." Thus, in at least one embodiment, the audience segment associated with this particular combination includes all users associated with the metric anomaly who are male, or who were referred by a search engine, or who are both male and were referred by a search engine.

It follows that in at least one embodiment, the segment manager 216 identifies audience segments represented by the overlap between top contributing factors. For example, in the example articulated above, the audience segment represented by the overlap between the top contributing factors "Gender: Male" and "Referrer Type: Search Engine" would include all users associated with the metric anomaly who are both male and were referred by a search engine. In one or more embodiments, the segment manager 216 identifies a number of users associated with a particular audience segment, as well as a percentage representing the number of users associated with a particular audience segment relative to all user associated with the metric anomaly.

In order to determine which of the constructed combinations of top contributing factors is representative a top contributing audience in relation to a particular metric anomaly, the segment manager 216 can determine a weighted confidence score for each of the constructed combinations of top contributing factors. In one or more embodiments, in order to determine a weighted confidence score for a particular combination of top factors, the segment manager 216 first identifies a contribution score associated with each of the top factors in the combination. For example, as described above, the contribution analyzer 214 can utilize statistical analysis and machine learning in association with data related to a factor to calculate a contribution score for that factor. Accordingly, the segment manager 216 can identify the contribution scores calculated by the contribution analyzer 214 for each top factor in a constructed combination.

Next, in order to determine a weighted confidence score for a constructed combination, the segment manager 216 identifies an intersection percentage for the constructed combination. In one or more embodiments, the segment manager 216 identifies an intersection percentage for the constructed combination by querying data for the intersection of the top contributing factors represented in the constructed combination. In at least one embodiment, the segment manager 216 utilizes statistical analysis and machine learning in connection with the queried data to then identify the intersection percentage for the constructed combination.

Following this, the segment manager 216 can identify the overall size of the audience segment associated with the constructed combination. For example, in the constructed combination utilized above, the overall size of the audience segment associated with the constructed combination of the top factors "Gender: Male," "Registration Type: Anonymous," and "Referrer Type: Search Engine" would be the overall size of the audience of users who are associated with one or more of the factors "Gender: Male," "Registration Type: Anonymous," and "Referrer Type: Search Engine." It follows that, in one or more embodiments, the segment manager 216 identifies a percentage that represents the size of the audience segment associated with the constructed combination in relation to the overall size of the audience associated with the metric anomaly.

Once the segment manager 216 has identified the contribution score associated with each of the top factors in a constructed combination, the intersection percentage for the constructed combination, and the overall size of the audience segment associated with the constructed combination, the segment manager 216 calculates the weighted confidence score for the constructed combination. For example, in at least one embodiment, the segment manager 216 calculates the weighted confidence score according to the following equation: (CONTRIBUTION_SCORE_WEIGHT*Average(CONTRIBUTION_SCORES))+ (INTERSECTION_WEIGHT*INTERSECTION_PERCENTAGE)+ (AUDIENCE_SIZE_WEIGHT*AUDIENCE_SIZE). In one or more embodiments, the segment manager 216 identifies a weighted confidence score for each constructed combination of top contributing factors. In one or more embodiments, the CONTRIBUTION_SCORE_WEIGHT is 0.4, the INTERSECTION_WEIGHT is 0.4, and the AUDIENCE_SIZE_WEIGHT is 0.2. As shown, the weighted confidence score represents the significance, impact, and size of each segment. Thus, a large segment with a low impact may score lower than a small segment with a large impact.

After the segment manager 216 has calculated a weighted confidence score for each constructed combination of top contributing factors, the segment manager 216 can sort the audience segments associated with each of the constructed combinations according to the weighted confidence scores. As discussed above, each constructed combination is representative of an audience segment including users who performed the user actions associated with the contributing factors that make up the constructed combination. Accordingly, in at least one embodiment, the constructed combination with the highest weighted confidence score is associated with the audience segment that likely contributed most significantly to the metric anomaly being analyzed.

As illustrated in FIG. 2, and as mentioned above, the analytics manager 106 can include a display generator 218. In one or more embodiments, the display generator 218 can generate displays of calculations and analyses performed by any of the data query manager 210, the anomaly detector 212, the contribution analyzer 214, and the segment manager 216. For example, the display generator 218 can generate trends, hierarchical trees, scatter plots, charts, or any other type of display. Furthermore, the display generator 218 can communicate generated displays to the display manager 202 of the analytics application 116 installed on the client-computing device 114a, as will be described in more detail below.

As mentioned above, and as illustrated in FIG. 2, the analytics manager 106 can also include a data storage 220. The data storage 220 may maintain anomaly data 222, contribution data 224, segment data 226, as well as display data 228. In one or more embodiments, the anomaly data 222 may include anomaly information identified and calculated by the analytics manager 106. Furthermore, in one or more embodiments, the contribution data 224 may include contribution information identified and analyzed by the analytics manager 106. In one or more embodiments, the segment data 226 may include segment information identified and analyzed by the analytics manager 106. Additionally, in one or more embodiments, the display data 228 may include display information generated by the analytics manager 106.

As will be described in more detail below, the components of the analytics system 100 as described with regard to FIGS. 1 and 2 can provide, along and/or in combination with other components, one or more graphical user interfaces ("GUIs"). In particular, the components can allow a user to interact with a collection of display elements for a variety of purposes. Specifically, FIGS. 3A-3F and the description that follows illustrate various example embodiments of the GUIs and features that are in accordance with general principles as described above.

As described above, the analytics manager 106 can assist a user in identifying metric anomalies in a networking environment (e.g., increases/decreases in a particular type of user action performed in connection with a website), and determining what factors caused those metric anomalies. It will be noted that while the functionality of the analytics manager 106 is described in FIGS. 3A-3F in associated with a website, in additional embodiments, the functionality of the analytics manager 106 can apply to other network environments. For example, the analytics manager 106 can analyze metric anomalies associated with a software application. The functionality of the analytics manager 106 will now be described, however, in greater detail with reference to FIGS. 3A-3F and in association with the website "Geometrixx Outdoors."

Figure 3A:
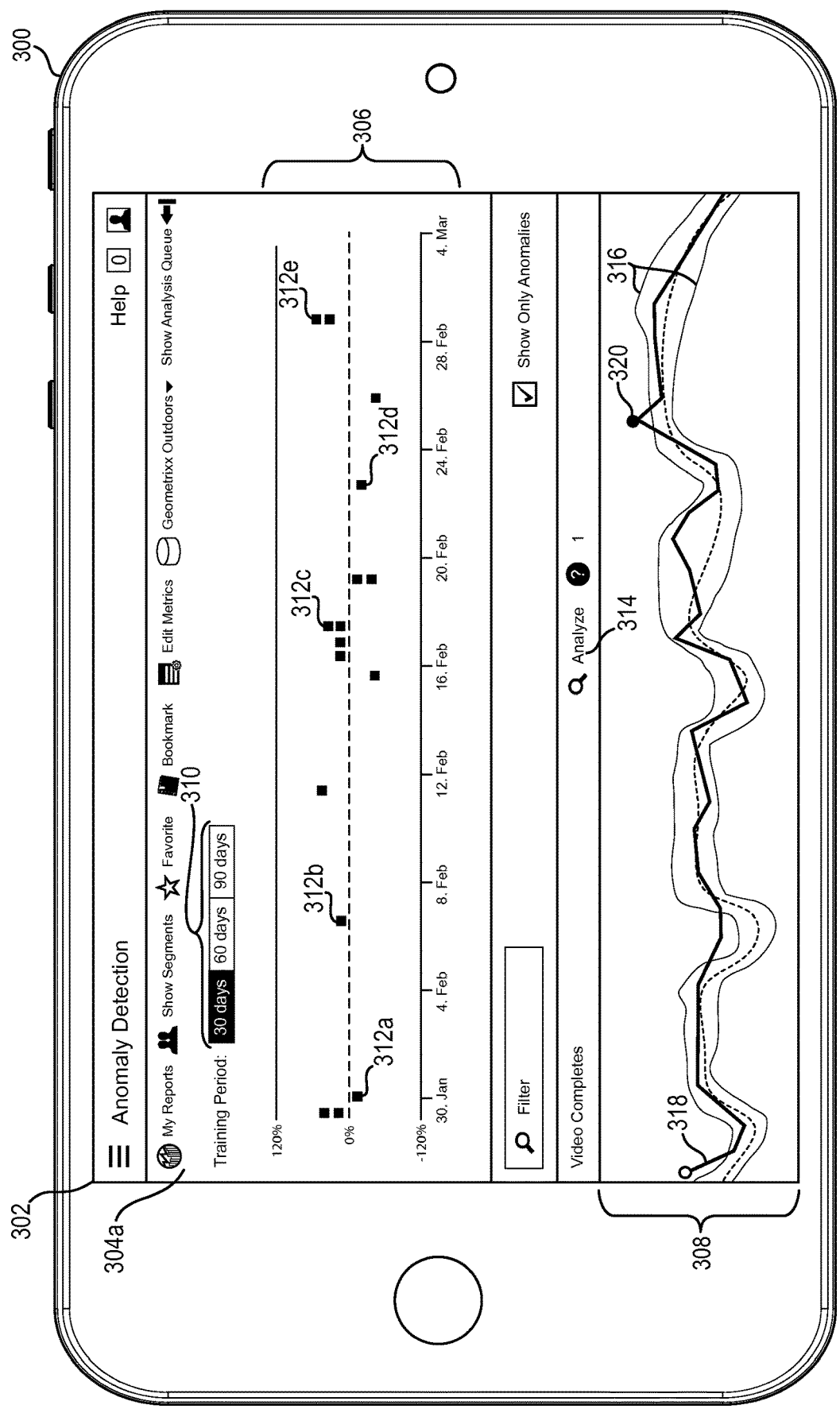
FIGS. 3A-3F illustrate a series of user interfaces in connection with the analytics system in accordance with one or more embodiments.

For example, FIGS. 3A-3F illustrate various views of GUIs provided at the client computing device 114a by way of the analytics application 116. As mentioned above, in some embodiments, a client-computing device (i.e., the client-computing device 114a) can implement and/or provide features from the analytics system 100. For example, FIG. 3A illustrate a client-computing device 300 (i.e., the client computing device 114a) of a server user (i.e., the user 118a) that may implement one or more of the components or features of the analytics manager 106. As shown, the client-computing device 300 is a handheld device, such as a tablet computer. As used herein, the term "handheld device" refers to a device sized and configured to be held in a single hand of a user. In additional or alternative examples, however, any other suitable computing device, such as, but not limited to, a mobile phone, larger wireless device, laptop or desktop computer, a personal digital assistant device, and/or any other suitable computing device can perform one or more of the processes and/or operations described herein.

As illustrated in FIG. 3A, the client-computing device 300 includes a touch screen display 302 that can display user interfaces and by way of which user input may be received and/or detected. As used herein, a "touch screen display" refers to the display of a touch screen device. In one or more embodiments, a touch screen device may be the client computing device 114a with at least one surface upon which a user may perform touch gestures (e.g., a laptop, a tablet computer, a personal digital assistant, a media player, a mobile phone, etc.). Additionally or alternatively, the client-computing device 300 may include any other suitable input device, such as a touch pad or those described below in reference to FIG. 5.

In FIG. 3A, the touch screen display 302 of the client computing device 300 displays an anomaly detection GUI 304a provided by the display manager 202 of the analytics application 116 installed thereon. In one or more embodiments, the display manager 202 provides the anomaly detection GUI 304a in order to display one or more anomalies identified in connection with a network entity. For example, in FIG. 3A, the anomaly detection GUI 304a includes an anomaly graph 306 illustrating anomaly plot points (e.g., anomaly plot points 312a-312e) representative of metric anomalies identified by the anomaly detector 212 in connection with a website (e.g., "Geometrixx Outdoors").

As described above, the anomaly detector 212 can identify metric anomalies associated with a website by comparing current metric data against training data for a given time period. As illustrated in FIG. 3A, a user (e.g., the user 118a) can select the time period associated with the training data by clicking a button in the training period control 310 (e.g., "30 days," "60 days," "90 days"). In one or more embodiments, and in response to selecting a training period of "30 days" via the training period control 310, the anomaly detector 212 can compare current metric data against training data over a period of the previous 30 days. In at least one embodiment, the anomaly detector 212 can compare metric data for every metric associated with the website (e.g., page lands, video completes, hyperlink clicks, etc.).

In response to identifying one or more anomalies, the display generator 218 can generate and provide an anomaly graph 306, as illustrated in FIG. 3A. The anomaly graph 306 can include one or more anomaly plot points (e.g., anomaly plot points 312a-312e), wherein each anomaly plot point 312a-312e represents an identified anomaly. The display generator 218 can generate the anomaly graph 306 such that each anomaly plot point 312a-312e is positioned along a timeline that indicates when the associated anomaly occurred.

In response to a user selecting a particular anomaly plot point (i.e., the anomaly plot point 312e for the metric "Video Completes"), the anomaly detector 212 can utilize predictive analysis in connection with the training data to identify an expected range of performance for a metric over a period of time. Similarly, in response to a user selecting a particular anomaly plot point, the anomaly detector 212 can also identify a metric's actual performance over a period of time. In one or more embodiments, the display generator 218 can generate an anomaly trend display 308, as illustrated in FIG. 3A, in order to display a comprehensive view of both the expected range of performance for a metric, as well as the metric's actual performance over the same time range. As shown in FIG. 3A, the display generator 218 can display the metric's expected range of performance as an expected range indicator 316, over which the display generator 218 displays the metric's actual performance as an anomaly trend line 318. Accordingly, a user can easily identify a specific anomaly analysis point 320 where the anomaly trend line 318 runs outside the expected range indicator 316.

In response to the user selecting the anomaly analysis point 320 and the analyze control 314, the contribution analyzer 214 can identify one or more contributing factors associated with the anomaly analysis point 320. As described above, the contribution analyzer 214 can identify factors that contributed to the anomaly in the "Video Completes" metric by processing a series of data reports against the analytics database 108 in order to gather data associated with video completes (e.g., a "video complete" occurs when a user plays a video embedded in a web page from start to finish). Then, the contribution analyzer 214 can utilize machine learning against the data set returned from the analytics database 108 to determine which factors statistically contributed to the anomaly analysis point 320.

Figure 3B:
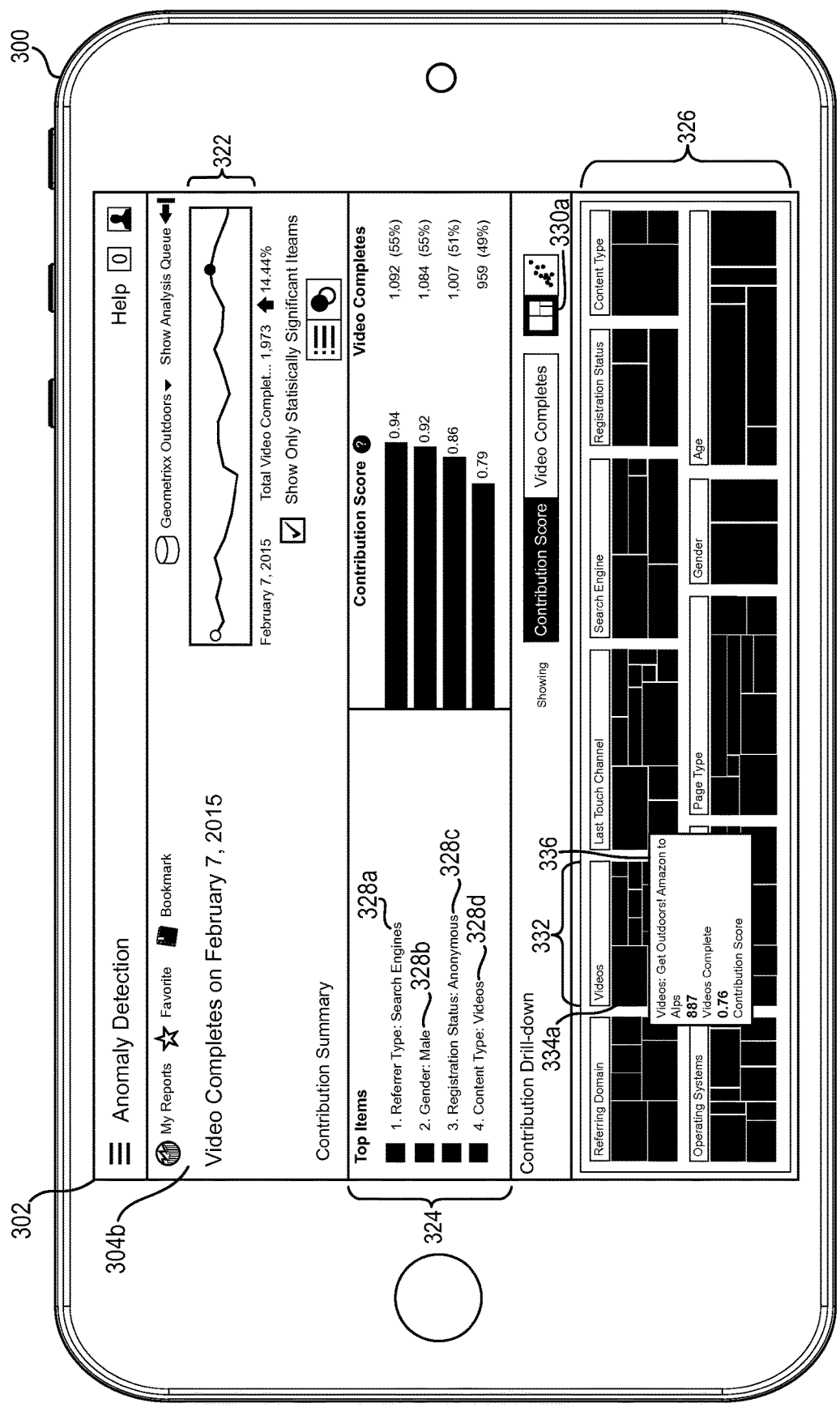

In response to the contribution analyzer 214 identifying one or more contributing factors associated with an anomaly, the display generator 218 can generate a contributing factor GUI. For example, as shown in FIG. 3B, the display generator can generate the contributing factor GUI 304b for display by the display manager 202 on the touch screen display 302 of the client-computing device 300. In one or more embodiments, the contributing factor GUI 304b can include a trend visualization 322. In at least one embodiment, the trend visualization 322 serves to provide a visual reminder of the anomaly analysis point 320 (as in FIG. 3A) for which the contribution analyzer 214 is identifying contributing factors.

As described above, the contribution analyzer 214 can calculate a normalized contribution score for every identified factor that indicates how statistically significant a factor's contribution is in relation with a particular metric anomaly. Additionally, as described above, the contribution analyzer 214 can also rank or order identified factors according to each factor's normalized contribution score. Accordingly, in response to the contribution analyzer 214 identifying and ranking contributing factors, the display generator 218 can generate and provide a top contributing items list 324, as illustrated in FIG. 3B.

In one or more embodiments, the top contributing items list 324 can include one or more contributing factor controls 328a-328d. Each contributing factor control, 328a, 328b, 328c, and/or 328d can include a description of the represented factor, a visual representation of the factor's contribution score (i.e., as a bar graph), and an indication of how many particular user actions (e.g., video completes) are attributed to the factor. For example, as shown in FIG. 3B, the contributing factor control 328a is associated with the factor "Referrer Type: Search Engines." Accordingly, the contributing factor associated with the contributing factor control 328a indicates that a top contributing factor for the "video completes" metric anomaly was that a statistically significant number of the video completes were performed by users who were referred to the website "Geometrixx Outdoors" by "search engines."

Similarly as shown in FIG. 3B, the contributing factor control 328b is associated with the factor "Gender: Male," indicating the second highest contributing factor for the "video completes" metric anomaly indicates that a statistically significant number of the video completes were performed by users who identify as male. Next as shown in the top contributing items list 324, the third highest contributing factor (i.e., as in contributing factor control 328c) for the "video completes" metric anomaly indicates that a statistically significant number of the video completes were performed by users who have an anonymous registration status. Furthermore, the next highest contributing factor (i.e., as in contributing factor control 328d) for the "video completes" metric anomaly indicates that metric anomaly "video completes" occurred in connection with content having a type of "videos."

A user may find that some contributing factors identified by the contribution analyzer 214 are redundant, or fail to tell the user something new. For example, as with the contributing factor associated with the contributing factor control 328d, the user likely already knew that content associated with the "video complete" metric would be associated with a "video" type. Accordingly, in some embodiments, the display generator 218 can include controls within the contributing factor GUI 304b that allow a user to selectively remove contributing factor controls from the top contributing items list 324.

As illustrated in FIG. 3B, the contribution score associated with the contributing factor control 328a is "0.94." As mentioned above, as a factor's contribution score approaches "1," there is and indicates a strong association between the factor "Referrer Type: Search Engines" and the metric anomaly being analyzed for the metric "Video Completes." In other words, because "Referrer Type: Search Engines" had a contribution score close to "1," it is likely "Referrer Type: Search Engines" strongly contributed to the occurrence of the "Video Completes" anomaly.

Furthermore, the contributing factor controls 328a-328d also include an indication of how many particular user actions are attributable to the factor associated with each of the factor controls 328a-328d. For example, as shown in FIG. 3B, the contributing factor control 328a includes an indication that 1,092 video completes were performed by users who were referred to "Geometrixx Outdoors" by "search engines." Additionally, the contributing factor control 328a includes a percentage indicating how many of the total number of video completes can be attributed to the factor "Referrer Type: Search Engine." For example, the contributing factor control 328a indicts that 55% of the video completes in the anomaly associated with the contributing factor GUI 304*b* were performed by users who were referred to "Geometrixx Outdoors" by "search engines."

Also as illustrated in FIG. 3B, the contribution analyzer 214 can rank or organize factors based on their contribution scores. It follows that the display generator 218 can similarly rank or organize the contributing factor controls 328*a*-328*d* based on the contribution scores of their associated factors within the top contributing items list 324. As shown in FIG. 3B, the display generator 218 can organize the contributing factor controls 328*a*-328*d* such that the contributing factor control associated with the factor with the highest contribution score (i.e., the contributing factor control 328*a*) is first in the top contributing items list 324, followed by the contributing factor controls 328*b*-328*d* in descending order based on their contribution scores. In alternative or additional embodiments, the display generator 218 can organize the top contributing items list 324 according to how many particular user actions are attributable to the factor associated with each of the factor controls 328*a*-328*d* (i.e., the values listed under the "video completes" column).

As mentioned above, the contribution analyzer 214 can also identify sub-factors associated with a particular factor. As described above, a factor can be a general type that can be further narrowed into sub-factors. For example, as shown in FIG. 3B, the contributing factor control 328*d* is associated with the factor "Content Type: Videos," which in turn can be associated with multiple sub-factors. For instance, sub-factors associated with the factor "Content Type: Videos" can include specific videos that are available for viewing on the website "Geometrixx Outdoors." To illustrate, in response to identifying within the top contributing items list 324 that the contributing factor control 328 for the "Content Type: Videos" has a contribution score of 0.79, a user may want further information on which specific videos visitors have been watching within "Geogmetrixx Outdoors." Accordingly, the user may desire to see further information on sub-factors (i.e., specific videos) associated with the factor "Content Type: Videos."

Thus, as described above, the display generator 218 can generate displays illustrating the sub-factors related to a particular factor. For example, as shown in FIG. 3B, the display generator 218 can generate and provide a hierarchical tree diagram 326 illustrating the relationship between factors and various sub-factors associated with each factor. For instance, the sub-factor display 332 is associated with the factor "Videos" (i.e., as is the contributing factor control 328*d*), and includes several boxes of varying sizes. In one or more embodiments, each box within the sub-factor display 332 is a sub-factor control (i.e., as with the sub-factor control 334*a*), and is associated with the sub-factor display 332.

In one or more embodiments, in response to a user hovering a mouse or pressing and holding a touch gesture over the sub-factor control 334*a*, the display generator 218 can provide a pop-up sub-factor information display 336. For example, the sub-factor information display 336 can include a description of the sub-factor associated with the sub-factor control 334*a* (i.e., "Get Outdoors! Amazon to Alps"), which in this case, is the title of a video available for viewing on "Geometrixx Outdoors." In at least one embodiment, the sub-factor information display 336 can include additional information such as a total number of user actions that are attributable to the sub-factor represented by the sub-factor control 334*a* (i.e., "887 Video Completes"). In this example, the sub-factor information display 336 informs the user that of the 959 video completes that are attributable to the factor "Content Type: Videos," 887 of those video completes were accomplished by users who were watching the video "Get Outdoors! Amazon to Alps."

Similarly, the sub-factor information display 336 can include a contribution score associated with the sub-factor associated with the sub-factor control 334*a* (i.e., 0.76). In one or more embodiments, the contribution analyzer 214 can calculate a contribution score for a sub-factor in a similar manner to how the contribution analyzer 214 calculates a contribution score for a factor, as described above. Briefly, the contribution analyzer 214 can query all data related to the sub-factor from the analytics database 108 and utilize statistical machine learning in connection with the queried data to determine how the sub-factor contributes to the factor with regard to a particular anomaly. Accordingly, as shown in FIG. 3B, the video "Get Outdoors! Amazon to Alps" has a contribution score of 0.76 with regard to the factor "Content Type: Videos," which has a contribution score of 0.79 with regard to the anomaly identified in the metric "Video Completes."

Furthermore, in one or more embodiments, the size and/or placements of the sub-factor control 334*a* within the sub-factor display 332 is indicative of how the sub-factor associated with the sub-factor control 334*a* contributed to the factor associated with the sub-factor display 332, relative to the other sub-factors represented within the sub-factor display 332. For example, as shown in FIG. 3B, the sub-factor control 334*a* is larger than the other sub-factor controls within the sub-factor display 332. In at least one embodiment, the display generator 218 can configure the sub-factor control 334*a* to be larger than the other sub-factor controls in response to a determination that the sub-factor associated with the sub-factor control 334*a* had the most significant contribution to the factor associated with the sub-factor display 332.

Figure 3C:
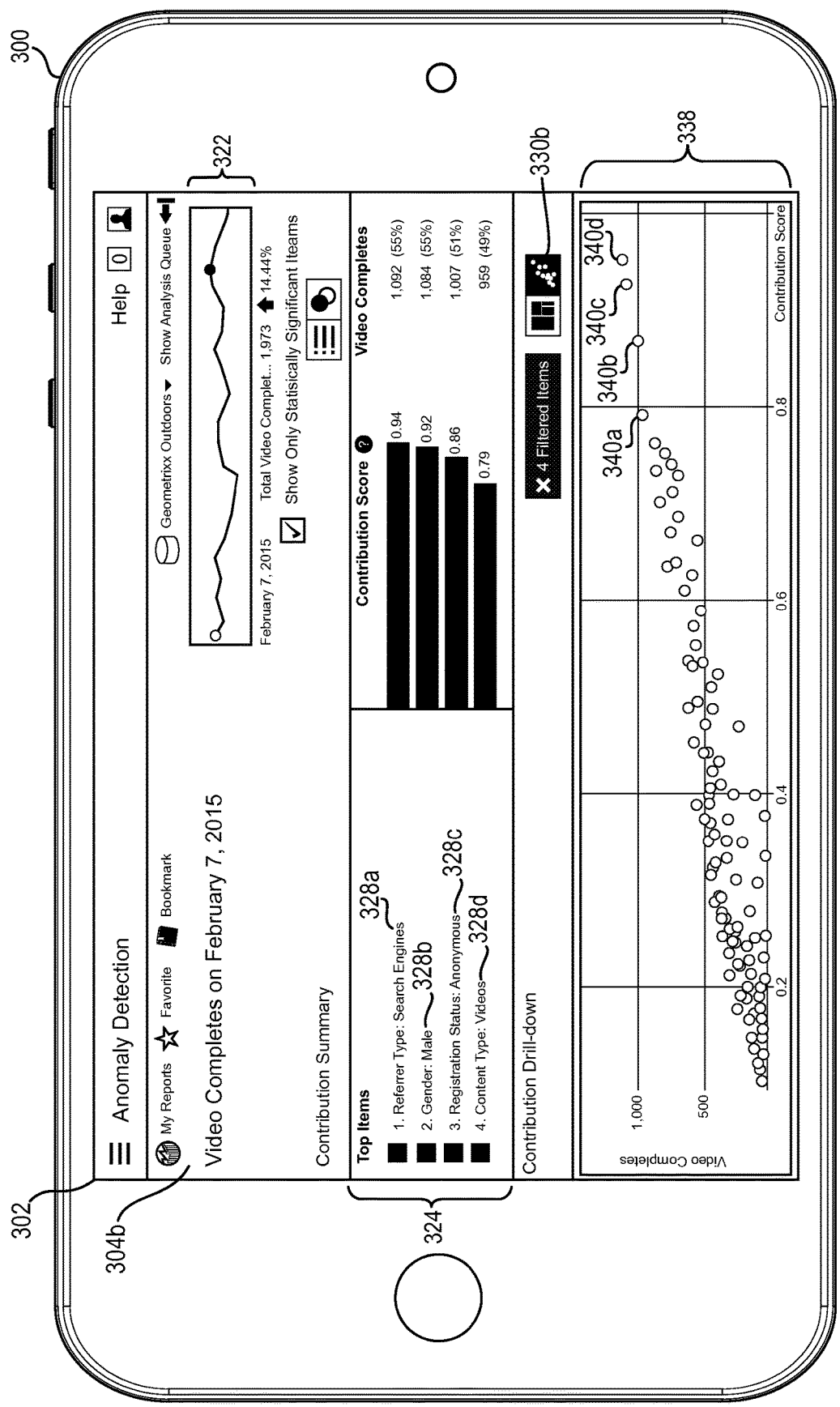

In one or more embodiments, the display generator 218 can provide various displays associated with factors and sub-factors that contribute to a particular anomaly. For example, as shown in FIG. 3B and in response to a user selecting the display control 330*a*, the display generator 218 can provide the hierarchical tree diagram 326. Alternatively or additionally, as shown in FIG. 3C and in response to a user selecting the display control 330*b*, the display generator 218 can provide sub-factor information in a scatter plot diagram 338. In some embodiments, the sub-factor plot points 340*a*-340*d* are representative of the top contributing sub-factors across all top-contributing factors associated with a metric anomaly. For example, the sub-factor plot point 340*d* can be representative of the top-contributing sub-factor associated with the factor represented by the contributing factor control 328*a* (as shown in FIG. 3B). Similarly, the sub-factor plot point 340*c* can be representative of the top-contributing sub-factor associated with the factor represented by the contributing factor control 328*b* (as shown in FIG. 3B), and so forth. Alternatively, the sub-factor plot points 340*a*-340*d* may be representative of sub-factors associated with a single factor. In that case, the sub-factor plot point 340*d* would have the highest contribution score of all the sub-factors associated with a single factor.

Figure 3D:
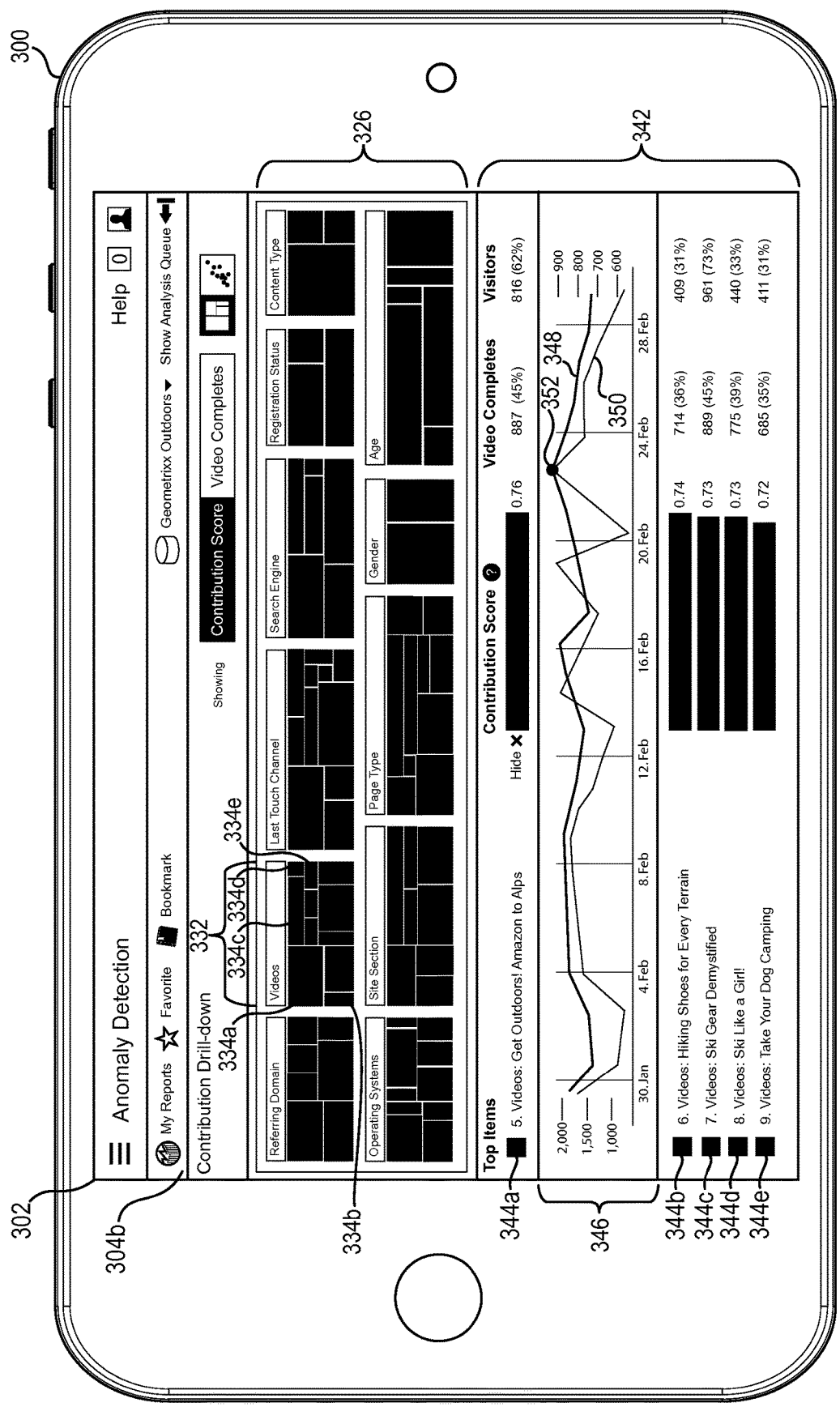

Additionally, in one or more embodiments, the display generator 218 can provide further analysis of sub-factors associated with a particular factor. For example, as shown in FIG. 3D and in response to a user selecting the sub-factor display 332, the display generator 218 can provide a sub-factor list 342. In at least one embodiment, the sub-factor list 342 includes one or more sub-factor controls 344*a*-344*e*, representative of the same sub-factors associated with the sub-factor controls 334*a*-334*e*. Each sub-factor control 344a-344e can include a description of the sub-factor associated with the control (e.g., "Videos: Get Outdoors! Amazon to Alps," "Videos: Hiking Shoes for Every Terrain"), as well as a contribution score for the sub-factor associated with the control, a number of user actions attributable to the sub-factor associated with the control (e.g., under the "video completes" column), and a number of user whose actions are attributable to the sub-factor associated with the control (e.g., under the "visitors" column).

In response to a user selecting one of the sub-factor controls 344a-344e, the display generator 218 can provide a sub-factor trend display 346, as illustrated in FIG. 3D. In one or more embodiments, the sub-factor trend display 346 can illustrate how a particular sub-factor performed in relation to its associated factor. For example, the factor trend line 348 shows what number of video completes per day are attributable to the factor "Content Type: Videos." Additionally, the sub-factor trend line 350 shows what number of video completes per day are attributable to the sub-factor "Videos: Get Outdoors! Amazon to Alps." Accordingly, a user can easily see at the anomaly point 352 that on a particular day, the video, "Get Outdoors Amazon to Alps," strongly contributed to the contribution of the factor "Content Type: Videos."

As discussed above, the GUIs illustrated in FIGS. 3A-3D show how a network manager might identify one or more factors that contribute significantly to a particular metric anomaly. For example, FIGS. 3A-3D show how the network manager might utilize the GUIs and controls therein to determine that a website anomaly in the number of video completes was likely caused by increases in anonymously registered males being directed to the website by a search engine. Once the network manager's has determined "what" caused the particular anomaly (i.e., the identified contributing factors), the network manager's next question may naturally be "who" are the users associated with the identified contributing factors. Identifying audiences of users associated with contributing factors can help a network manager target specific users who utilize the website in specific ways.

Accordingly, once the contribution analyzer 214 has identified one or more top contributing factors associated with a particular anomaly, the segment manager 216 identifies one or more audiences associated with the top contributing factors. As discussed above, every contributing factor is associated with a particular audience segment (i.e. a group of users who performed the action represented by the contributing factor). It is possible, however, that there is some overlap between audience segments associated with the contributing factors. In other words, it is possible that an audience segment exists that represents a group of users who are associated with more than one contributing factor.

Figure 3E:
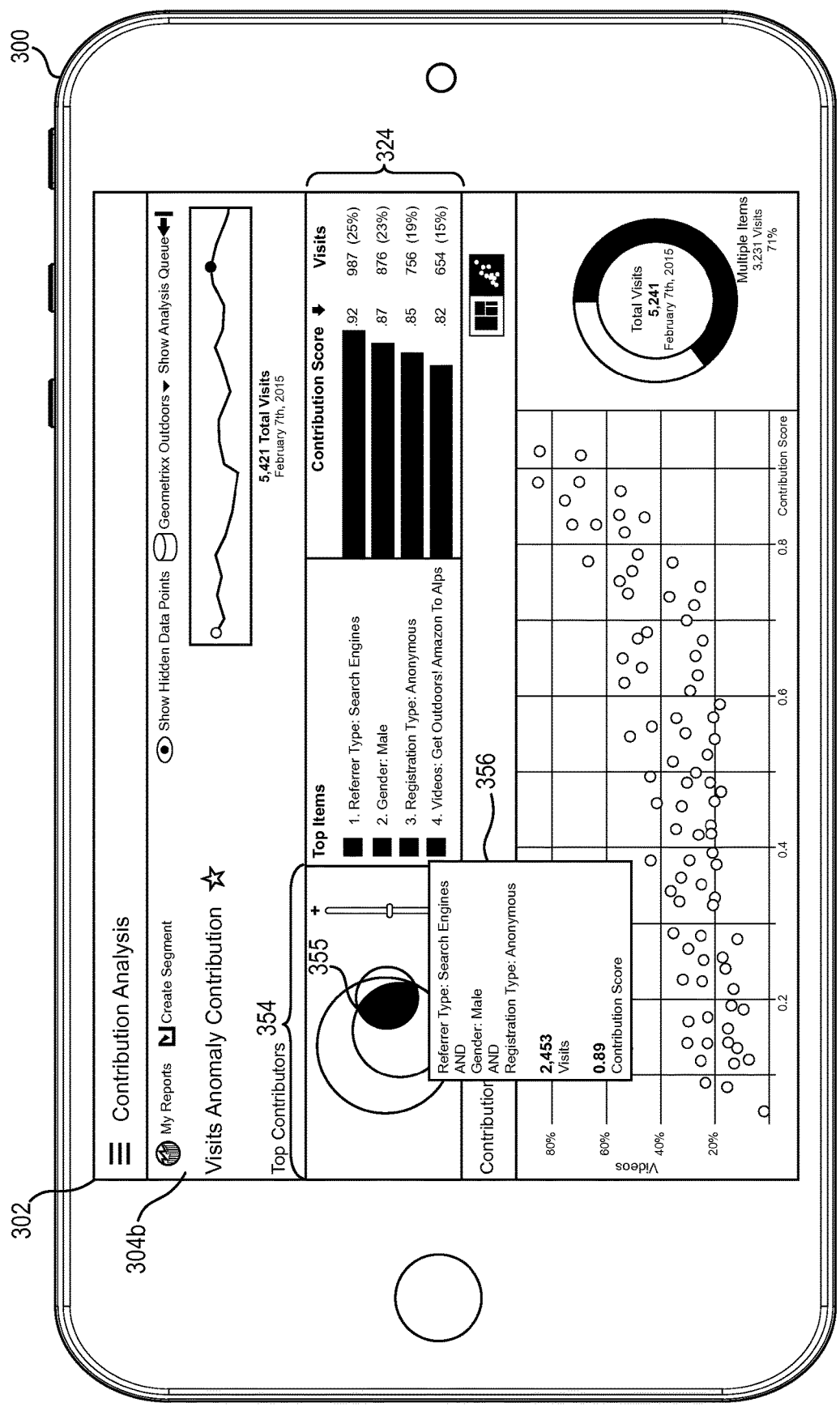

Accordingly, as shown in FIG. 3E, the segment manager 216 provides visualizations of various overlaps between the audience segments associated with top contributing factors. For example, the display generator 218 provides a Venn diagram control 354 adjacent to the top contributing items list 324 within the contributing factor GUI 304b displayed on the touch screen display 302 of the client computing device 300. In one or more embodiments, the Venn diagram control 354 illustrates the overlap between audience segments associated with the top contributing factors listed in the top contributing items list 324. In at least one embodiment, the size of the circles within the Venn diagram control 354 corresponds with the size of the audience segments associated with each represented contributing factor. Additionally, in one or more embodiments, the overlap area 355 within the Venn diagram control 354 represents an audience segment of users who are associated with the all of the contributing factors represented within the Venn diagram control 354.

In response to a user hovering a mouse pointer or performing a touch gesture in connection with the Venn diagram control 354, the display generator 218 provides additional information associated with the Venn diagram control 354. In one or more embodiments, the display generator 218 provides the Venn diagram information display 356 in connection with the Venn diagram control 354. The Venn diagram information display 356 can include a listing of the top contributing factors included in the Venn diagram control 354 (i.e., "Referrer Type: Search Engines," "Gender: Male," "Registration Type: Anonymous"). In one or more embodiments, the Venn diagram information display 356 concatenates the represented contributing factors with an "AND" to represent the audience segment of users who are associated with the all of the contributing factors represented within the Venn diagram control 354. Furthermore, the Venn diagram information display 356 can include a total number of website visits attributable to the overlapping audience segment represented in the Venn diagram information display 356 (i.e., "2,453 visits"), as well as a combined contribution score attributed to the overlapping audience segment represented in the Venn diagram information display 356 (i.e., "0.89 Contribution Score").

Figure 3F:
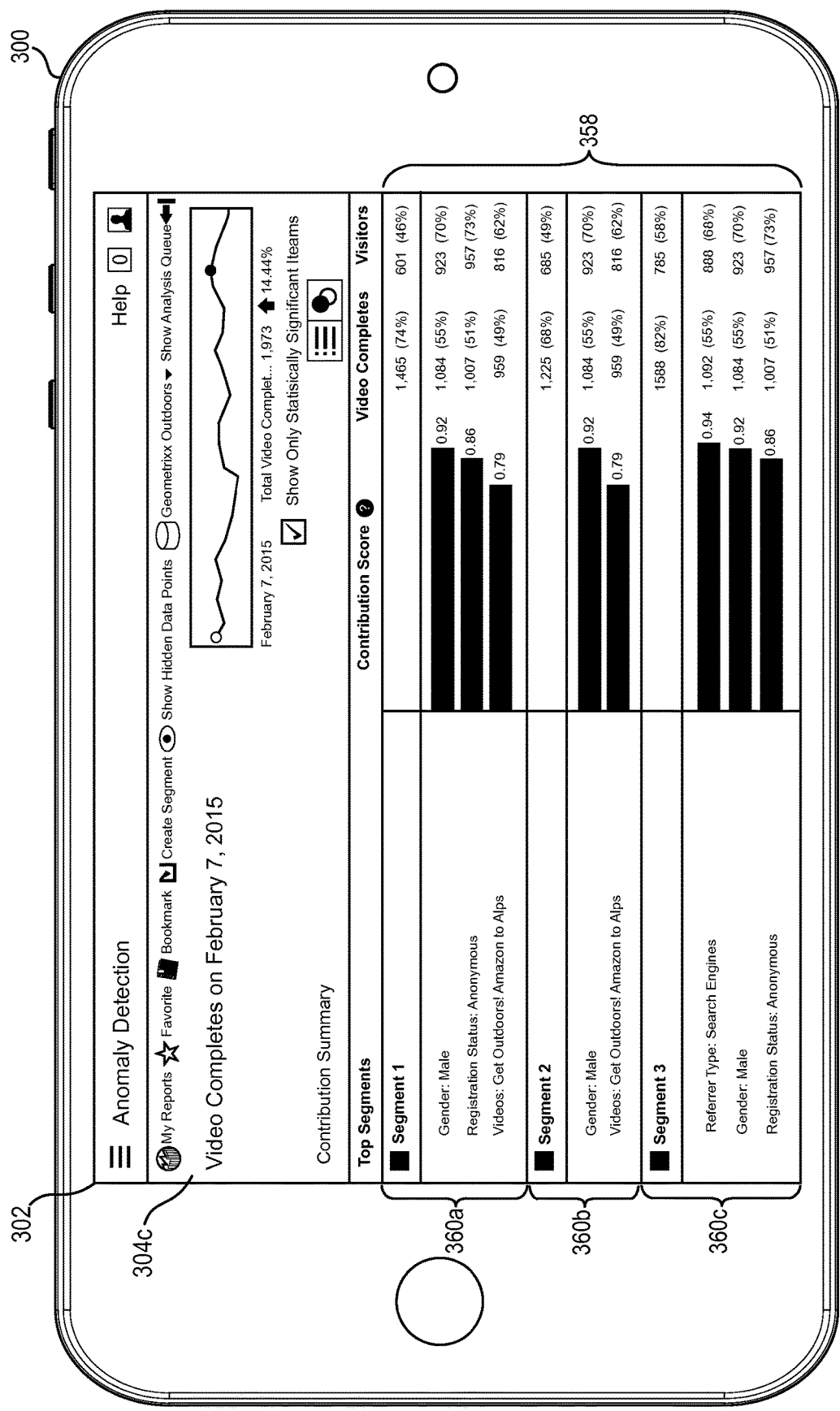

As mentioned above, the segment manager 216 generates various combinations of top contributing factors in order to identify a top contributing audience segment. For example, as shown in FIG. 3F, the display generator 218 provides a segment GUI 304c on the touch screen display 302 of the client-computing device 300. In one or more embodiments, the segment GUI 304c displays the segment list 358 including one or more segment controls 360a-360c. As described above, from a list of two or more top contributing factors, the segment manager 216 can construct unique, non-singular combinations of the two or more top contributing factors. Accordingly, in one or more embodiments, each of the segment controls 360a-360c is representative of one of the unique, non-singular combinations of the top contributing factors listed in the top contributing items list 324, shown in FIG. 3E.

Thus, in one or more embodiments and as illustrated in FIG. 3F, each segment control 360a-360c includes a listing of the top contributing factors included in the segment (e.g., "Segment 1" includes the top contributing factors "Gender: Male," "Registration Status: Anonymous," and "Videos: Get Outdoors! Amazon to Alps."). Additionally as shown in FIG. 3F, each segment control 360a-360c indicates the contribution scores for each top contributing factor, the number of user actions attributable to each top-contributing factor, and the number of users attributable to each top-contributing factor.

Furthermore, as discussed above, the segment manager 216 also calculates a weighted confidence score for each constructed audience segment. In one or more embodiments, the segment manager 216 can order the constructed audience segments according to their calculated confidence scores. For example, as shown in FIG. 3F, the segment control 360a is associated with the constructed audience segment with the highest calculated confidence score. Accordingly, in at least one embodiment, the audience segment associated with the segment control 360a is likely representative of a group of users whose actions in connection with the "Geometrixx Outdoors" website contributed most significantly to the anomaly being analyzed through FIGS. 3A-3F (i.e., the increase in video completes).

Figure 4:
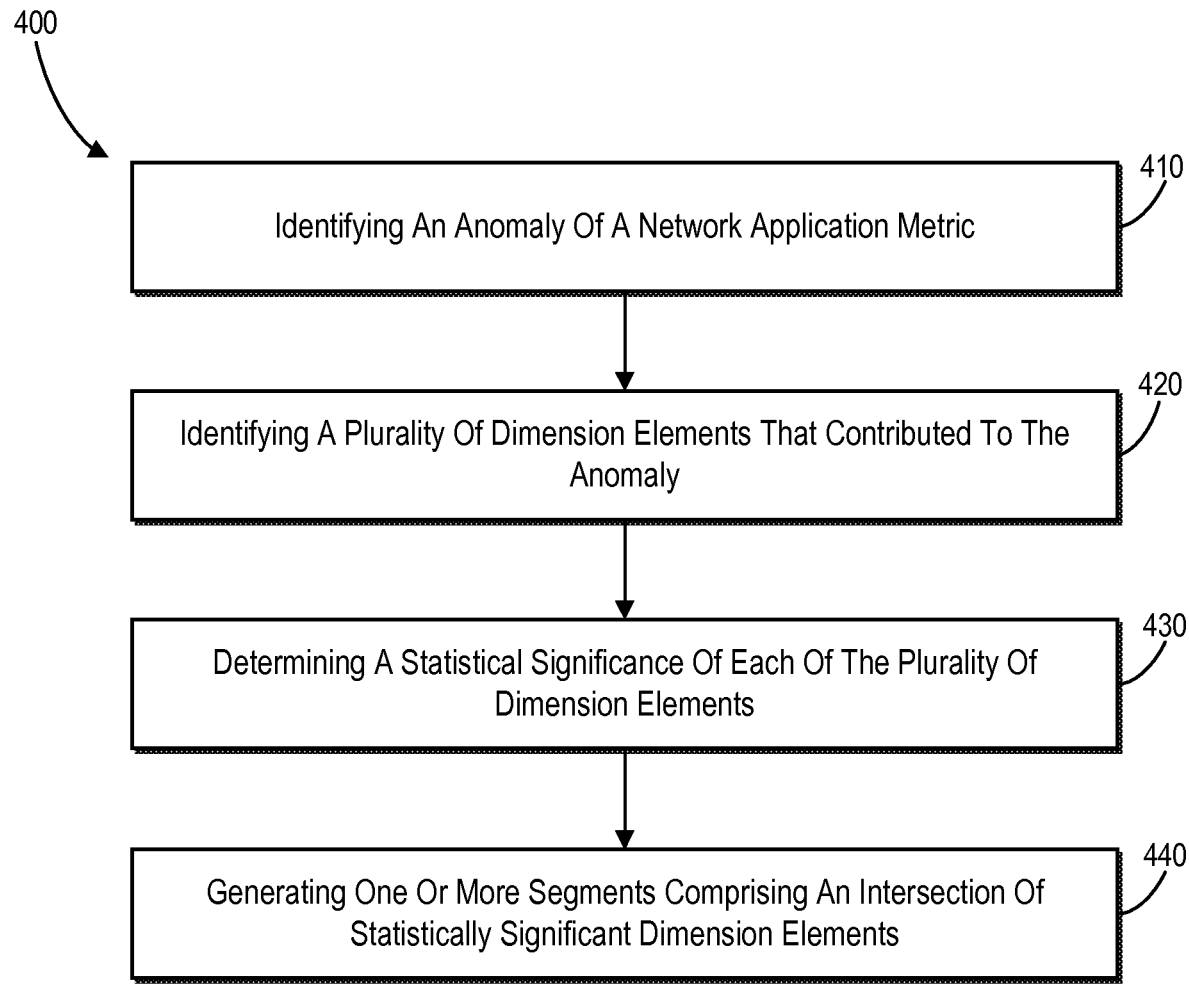
FIG. 4 illustrates a flowchart of a series of acts in a method of identifying contributing audiences related to a metric anomaly in accordance with one or more embodiments.

FIGS. 1-3F, the corresponding text, and the examples provide a number of different methods, systems, and devices for identifying statistically significant contributing audience segments associated with a metric anomaly. In addition to the foregoing, embodiments can also be described in terms of flowcharts comprising acts and steps in a method for accomplishing a particular result. For example, FIG. 4 illustrates a flowchart illustrating acts and steps in a method of identifying segments contributing to an anomaly. One will appreciate in light of the disclosure herein that the method may be performed with less or more steps/acts or the steps/acts may be performed in differing orders. Additionally, the steps/acts described herein may be repeated or performed in parallel with one another or in parallel with different instances of the same or similar steps/acts.

FIG. 4 illustrates a flowchart of one example method 400 of identifying statistically significant contributing audience segments associated with a metric anomaly. The method 400 includes an act 410 of identifying an anomaly of a network application metric. In particular, the act 410 can involve identifying an anomaly of a network application metric by analyzing analytics data associated with a network application. In one or more embodiments, identifying an anomaly of a network application metric by analyzing analytics data associated with a network application includes: identifying a range from the analytics data associated with the network application that indicates how the network application metric is expected to perform during a period of time, and identifying a value of network application metric that exists outside the identified range.

Additionally, the method 400 includes an act 420 of identifying a plurality of dimension elements that contributed to the anomaly. In particular, the act 420 can involve identifying a plurality of dimension elements that contributed to the anomaly of the network application metric. In one or more embodiments, identifying a plurality of dimension elements that contributed to the anomaly of the network application metric includes: receiving a selection of a period of time; querying a plurality of data associated with the network application metric within the selected period of time from a central repository; and analyzing the plurality of data for the plurality of dimension elements.

The method 400 also includes an act 430 of determining a statistical significance of each of the plurality of dimension elements. In particular, the act 430 can involve determining, by at least one processor, a statistical significance of each of the plurality of dimension elements that contributed to the anomaly of the network application metric. In one or more embodiments, determining a statistical significance of each of the plurality of dimension elements that contributed to the anomaly of the network application metric includes: calculating a statistical significance score for each of the plurality of the dimension elements that indicates the statistical significance of each of the plurality of the dimension elements, and normalizing the statistical significance score for each of the plurality of the dimension elements such that all the calculated statistical significance scores all reside within a comparable range.

Furthermore, the method 400 includes an act 440 of generating one or more segments comprising an intersection of statistically significant dimension elements. In particular, the act 440 can involve generating one or more segments, wherein each segment comprises an intersection of the statistically significant dimension elements that contributed to the anomaly of the network application metric. In one or more embodiments, generating one or more segments includes: identifying dimension elements in the plurality of dimension elements with the top normalized statistical significance scores, and generating unique, non-singular combinations of the identified dimension elements in the plurality of dimension elements with the top normalized statistical significance scores.

In one or more embodiments, the method 400 can also include ranking the generated one or more segments to identify an audience that contributed most significantly to the anomaly of the network application metric. In at least one embodiment, ranking the generated one or more segments includes: determining an audience size associated with each unique, non-singular combination of the identified dimension elements in the plurality of dimension elements with the top normalized statistical significance scores, identifying a percentage contribution associated with each unique, non-singular combination of the identified dimension elements in the plurality of dimension elements with the top normalized statistical significance scores based on the normalized statistical significance scores of the dimension elements in the unique, non-singular combination of the identified dimension elements in the plurality of dimension elements with the top normalized statistical significance scores that represents how each unique, non-singular combination contributed to the anomaly of the network application metric, for each unique, non-singular combination of the identified dimension elements in the plurality of dimension elements with the top normalized statistical significance scores, calculating a weighted confidence score based on the audience size and the percentage contribution, and ordering the one or more segments based on the weighted confidence scores.

As used herein, "top normalized statistical significance scores" refer to a top given number of normalized statistical significance scores. Alternatively, top normalized statistical significance scores refer to a top percentage of normalized statistical significance scores. For example, in one or more embodiments, top normalized statistical significance scores refer to the top ten percent of all normalized statistical significance scores.

Additionally, the method 400 can include presenting a top number of the ordered one or more segments. In one or more embodiments, the method 400 can further include: receiving a selection of one of the top number of ordered one or more segments; and configuring a segment report based on the selected segment that identifies the audience associated with the selected segment.

Another example method of identifying statistically significant contributing audience segments associated with a metric anomaly includes a step of receiving a selection of a network application metric from a display of network application metrics associated with actions or characteristics of users of a network application. The method further includes a step of identifying anomalies of the network application metric by analyzing analytics data associated with a network application, wherein the anomalies of the network application metric represent unexpected increases or decreases in the network application metric. In one or more embodiments, identifying anomalies of the network application metric by analyzing analytics data associated with a network application includes: identifying a range from the analytics data associated with the network application that indicates how the network application metric is expected to perform during a period of time, and identifying values of network application metric that exists outside the identified range.

The method also includes a step of receiving a selection of an anomaly of the network supplication metric. Additionally, the method includes steps of identifying a plurality of dimension elements that contributed to the selected anomaly of the network application metric, and determining a statistical significance score for dimension element that contributed to the selected anomaly of the network application metric. In one or more embodiments determining a statistical significance score for dimension elements that contributed to the selected anomaly of the network application metric includes normalizing calculated Pearson Residuals.

The method further includes steps of generating a plurality of segments comprising unique, non-singular combination of dimension elements having high statistical significance scores, and determining an audience size associated with each segment. The method also includes a step of identifying a percentage contribution associated with each segment based on the statistical significance scores of the dimension elements in the unique, non-singular combination of dimension elements forming the segment. Additionally, the method includes steps of calculating a weighted confidence score for each segment based on the audience size and the percentage contribution, and ordering the plurality of segments based on the weighted confidence scores.

In one or more embodiments, calculating a weighted confidence score for each segment based on the audience size and the percentage contribution comprises calculating weighted confidence scores according to the following equation: (a contribution score weight*average contribution score of the dimension elements in the unique, non-singular combination forming the segment))+(intersection weight*percentage contribution)+(audience size weight*audience size). Additionally, in at least one embodiment, the audience size weight is lower than both the contribution score weight and the intersection weight. Furthermore, in at least one embodiment, the network application is a website.

In one or more embodiments, the method further includes a step of presenting a top number of ordered segments. Furthermore, in at least one embodiments, the method further includes steps of receiving a selection of one of the top number of ordered segments, and configuring a segment report based on the selected segment that identifies the audience associated with the selected segment.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 5:
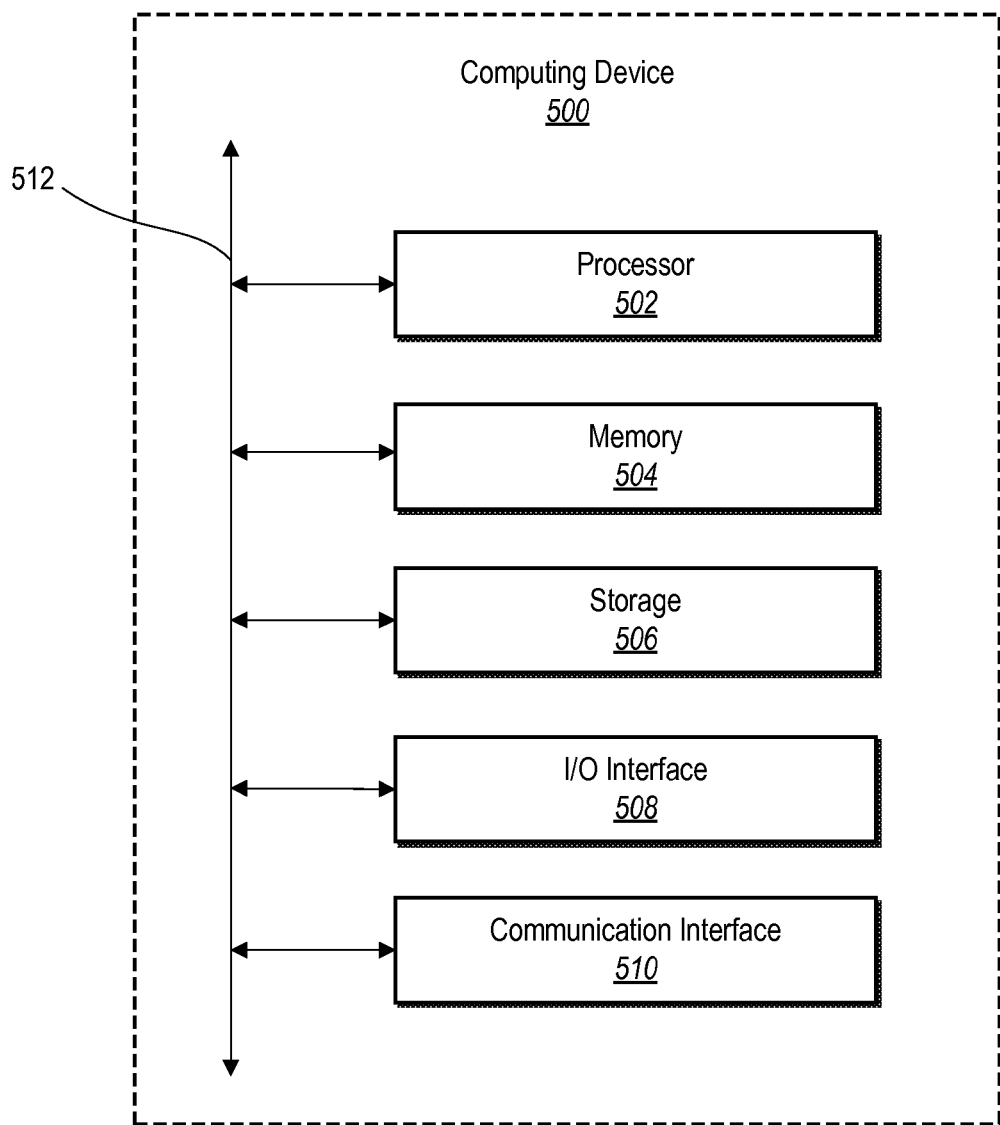
FIG. 5 illustrates a block diagram of an exemplary computing device in accordance with one or more embodiments.

FIG. 5 illustrates a block diagram of an exemplary computing device 500 that may be configured to perform one or more of the processes described above. One will appreciate that one or more computing devices, such as the computing device 500, may implement the segmenting system 100. In particular, any of the client-computing devices 114a-114d, the third-party network server 116, the server 104, the analytics database 108, and the network 112 can comprise a computing device 500. As shown by FIG. 5, the computing device 500 can comprise a processor 502, memory 504, a storage device 506, an I/O interface 508, and a communication interface 510, which may be communicatively coupled by way of a communication infrastructure 512. While an exemplary computing device 500 is shown in FIG. 5, the components illustrated in FIG. 5 are not intended to be limiting. Additional or alternative components may be used in other embodiments. Furthermore, in certain embodiments, the computing device 500 can include fewer components than those shown in FIG. 5. Components of the computing device 500 shown in FIG. 5 will now be described in additional detail.

In particular embodiments, the processor 502 includes hardware for executing instructions, such as those making up a computer program. As an example and not by way of limitation, to execute instructions, the processor 502 may retrieve (or fetch) the instructions from an internal register, an internal cache, the memory 504, or the storage device 506 and decode and execute them. In particular embodiments, the processor 502 may include one or more internal caches for data, instructions, or addresses. As an example and not by way of limitation, the processor 502 may include one or more instruction caches, one or more data caches, and one or more translation lookaside buffers (TLBs). Instructions in the instruction caches may be copies of instructions in the memory 504 or the storage 506.

The memory 504 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 504 may be internal or distributed memory.

The storage device 506 includes storage for storing data or instructions. As an example and not by way of limitation, the storage device 506 can comprise a non-transitory storage medium described above. The storage device 506 may include a hard disk drive (HDD), a floppy disk drive, flash memory, an optical disc, a magneto-optical disc, magnetic tape, or a Universal Serial Bus (USB) drive or a combination of two or more of these. The storage device 506 may include removable or non-removable (or fixed) media, where appropriate. The storage device 506 may be internal or external to the computing device 500. In particular embodiments, the storage device 506 is non-volatile, solid-state memory. In other embodiments, the storage device 506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 508 allows a user to provide input to, receive output from, and otherwise transfer data to and receive data from the computing device 500. The I/O interface 508 may include a mouse, a keypad or a keyboard, a touch screen, a camera, an optical scanner, network interface, modem, other known I/O devices or a combination of such I/O interfaces. The I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. The graphical data may be representative of one or more graphical user interfaces and/or any other graphical content as may serve a particular implementation.

The communication interface 510 can include hardware, software, or both. In any event, the communication interface 510 can provide one or more interfaces for communication (such as, for example, packet-based communication) between the computing device 500 and one or more other computing devices or networks. As an example and not by way of limitation, the communication interface 510 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 510 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 510 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 510 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 512 may include hardware, software, or both that couples components of the computing device 500 to each other. As an example and not by way of limitation, the communication infrastructure 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 6:
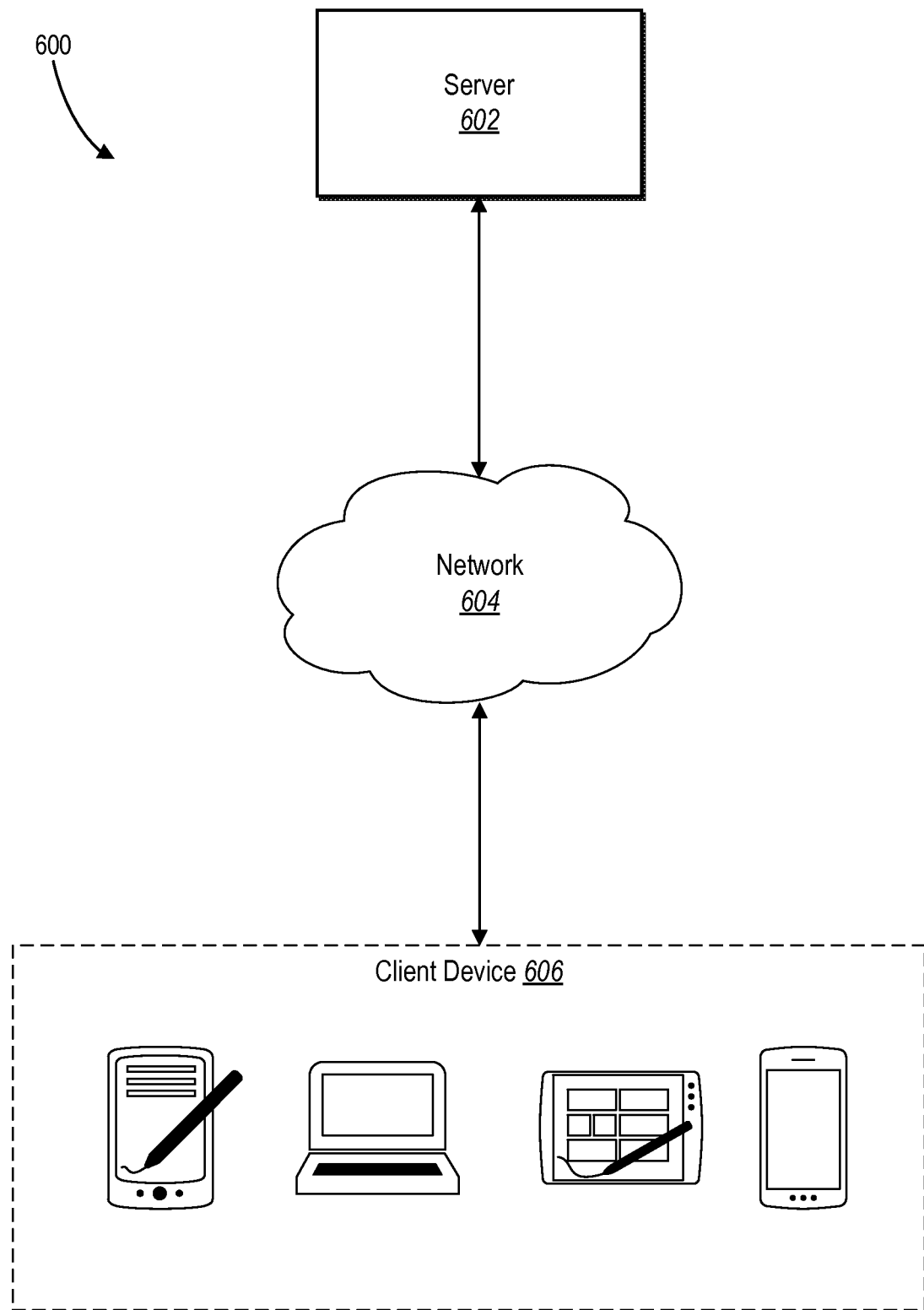
FIG. 6 is an example network environment of a server hosting the analytics manager in accordance with one or more embodiments.

FIG. 6 illustrates an example network environment 600 of in which the server 104 can operate. The network environment 600 includes a client system 606, a server 602, and a third-party system 608 connected to each other by a network 604. Although FIG. 6 illustrates a particular arrangement of the client system 606, the server 602, the third-party system 608, and the network 604, this disclosure contemplates any suitable arrangement of the client system 606, the server 602, the third-party system 608, and the network 604. As an example and not by way of limitation, two or more of the client system 606, the server 602, and the third-party system 608 may be connected to each other directly, bypassing network 604. As another example, two or more of the client system 606, server 602, and third-party system 608 may be physically or logically co-located with each other in whole or in part. Moreover, although FIG. 6 illustrates a particular number of client systems 606, servers 602, third-party systems 608, and networks 604, this disclosure contemplates any suitable number of client systems 606, servers 602, third-party systems 608, and networks 604. As an example and not by way of limitation, network environment 600 may include multiple client system 606, servers 602, third-party systems 608, and networks 604.

This disclosure contemplates any suitable network 604. As an example and not by way of limitation, one or more portions of network 604 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 604 may include one or more networks 604.

Links may connect client system 606, server 602, and third-party system 608 to communication network 604 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 600. One or more first links may differ in one or more respects from one or more second links.

In particular embodiments, client system 606 may be an electronic device including hardware, software, or embedded logic components or a combination of two or more such components and capable of carrying out the appropriate functionalities implemented or supported by client system 606. As an example and not by way of limitation, a client system 606 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 606. A client system 606 may enable a network user at client system 606 to access network 604. A client system 606 may enable its user to communicate with other users at other client systems 606.

In particular embodiments, client system 606 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 606 may enter a Uniform Resource Locator (URL) or other address directing the web browser to a particular server (such as server, or a server associated with a third-party system 608), and the web browser may generate a Hyper Text Transfer Protocol (HTTP) request and communicate the HTTP request to server. The server may accept the HTTP request and communicate to client system 606 one or more Hyper Text Markup Language (HTML) files responsive to the HTTP request. Client system 606 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server 602 may be capable of linking a variety of entities. As an example and not by way of limitation, server 602 may enable users to interact with each other as well as receive content from third-party systems 608 or other entities, or to allow users to interact with these entities through an application programming interfaces (API) or other communication channels.

In particular embodiments, a third-party system 608 may include one or more types of servers, one or more data stores, one or more interfaces, including but not limited to APIs, one or more web services, one or more content sources, one or more networks, or any other suitable components, e.g., that servers may communicate with. A third-party system 608 may be operated by a different entity from an entity operating server 602. In particular embodiments, however, server 602 and third-party systems 608 may operate in conjunction with each other to provide social-networking services to users of server 602 or third-party systems 608. In this sense, server 602 may provide a platform, or backbone, which other systems, such as third-party systems 608, may use to provide social-networking services and functionality to users across the Internet.

In particular embodiments, a third-party system 608 may include a third-party content object provider. A third-party content object provider may include one or more sources of content objects, which may be communicated to a client system 606. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, server 602 may include a variety of servers, sub-systems, programs, modules, logs, and data stores. In particular embodiments, server 602 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server 602 may also include suitable components such as network interfaces, security mechanisms, load balancers, failover servers, management-and-network-operations consoles, other suitable components, or any suitable combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
   identifying, by at least one processor, an anomaly of a network application metric indicating a particular type of user action performed by users in connection with a network application by analyzing analytics data associated with the network application;
   identifying, by the at least one processor, a plurality of dimension elements that contributed to the anomaly of the network application metric, the plurality of dimension elements comprising actions other than the particular type of user action that lead to the anomaly of the network application metric;
   determining, by the at least one processor, a statistical significance of each of the plurality of dimension elements that contributed to the anomaly of the network application metric by:
      calculating a statistical significance score for each of the plurality of the dimension elements that indicates the statistical significance of each of the plurality of the dimension elements, and
      normalizing the statistical significance score for each of the plurality of the dimension elements such that all the calculated statistical significance scores all reside within a comparable range;
   generating unique, non-singular combinations of a top threshold number of the identified dimension elements that contributed to the anomaly of the network application metric;
   generating, by the at least one processor, an audience segment for each of the unique, non-singular combinations of the top threshold number of the identified dimension elements, wherein each audience segment comprises a group of users who performed the actions represented by an intersection of the dimension elements in the respective unique, non-singular combination of the top threshold number of the identified dimension elements that contributed to the anomaly of the network application metric; and
   updating a portion of an interactive display associated with the network application to include a display of the generated audience segments of users that contributed to the identified anomaly of the network application metric.

2. The method as recited in claim 1, wherein identifying the anomaly of the network application metric indicating the particular type of user action performed by users in connection with the network application by analyzing the analytics data associated with the network application comprises:
   identifying a range from the analytics data associated with the particular type of user action performed in connection with the network application that indicates how the network application metric is expected to perform relative to the particular type of user action during a period of time; and
   identifying a value of the network application metric that exists outside the identified range.

3. The method as recited in claim 2, wherein generating the audience segment for each of the unique, non-singular combinations of the top threshold number of identified dimension elements comprises:
- identifying dimension elements in the plurality of dimension elements with normalized statistical significance scores that are within a top threshold number of normalized statistical significance scores;
- generating the unique, non-singular combinations of the identified dimension elements with normalized statistical significance scores that are within the top threshold number of normalized statistical significance scores; and
- identifying users who performed the actions represented by each unique, non-singular combination of the identified dimension elements with normalized statistical significance scores that are within the top threshold number of normalized statistical significance scores.

4. The method as recited in claim 3, further comprising ranking the generated audience segments to identify an audience of users who performed the actions that contributed most significantly to the anomaly of the network application metric.

5. The method as recited in claim 4, wherein ranking the generated audience segments comprises:
- determining a user audience size associated with each audience segment;
- identifying a percentage contribution associated with each audience segment based on the normalized statistical significance scores of the associated dimension elements that represents how each audience segment contributed to the anomaly of the network application metric;
- for each audience segment, calculating a weighted confidence score based on the user audience size and the percentage contribution; and
- ordering the audience segments based on the weighted confidence scores.

6. The method as recited in claim 5, wherein updating the portion of the interactive display comprises presenting a top number of the ordered audience segments within the portion of the interactive display.

7. The method as recited in claim 6, further comprising:
- receiving a user selection of one of the top number of ordered audience segments from within the portion of the interactive display; and
- configuring an audience segment report based on the selected audience segment that identifies the audience of users associated with the selected audience segment.

8. A non-transitory computer-readable medium storing instructions thereon that, when executed by at least one processor, cause a computer system to:
- identify anomalies of a network application metric indicating a particular type of user action performed by users in connection with the network application by analyzing analytics data associated with the network application, wherein the anomalies of the network application metric represent unexpected increases or decreases associated with the particular type of user action in connection with the network application metric;
- receive, via a portion of an interactive display associated with the network application, a selection of an anomaly of the network application metric;
- identify a plurality of dimension elements that contributed to the selected anomaly of the network application metric, the plurality of dimension elements comprising actions other than the particular type of user action, that lead to the anomaly of the network application metric;
- determine a statistical significance for dimension elements that contributed to the selected anomaly of the network application metric by:
  - calculating the statistical significance score for each of the plurality of the dimension elements that indicates the statistical significance of each of the plurality of the dimension elements, and
  - normalizing the statistical significance score for each of the plurality of the dimension elements such that all the calculated statistical significance scores all reside within a comparable range;
- generate unique, non-singular combinations of a top threshold number of the identified dimension elements that contributed to the selected anomaly of the network application metric;
- generate an audience segment for each of the unique, non-singular combinations of the top threshold number of the identified dimension elements, wherein each audience segment comprises a group of users who performed the actions represented by an intersection of the dimension elements in the respective unique, non-singular combination of the top threshold number of the identified dimension elements that contributed to the selected anomaly of the network application metric;
- determine an audience size associated with each audience segment;
- identify a percentage contribution associated with each audience segment based on the statistical significance scores of the associated dimension elements;
- calculate a weighted confidence score for each audience segment based on the audience size and the percentage contribution;
- order the audience segments based on the weighted confidence scores; and
- update a portion of an interactive display associated with the network application to include a display of the ordered audience segments.

9. The non-transitory computer-readable medium as recited in claim 8, wherein identifying anomalies of the network application metric indicating the particular type of user action performed by users in connection with the network application by analyzing analytics data associated with the network application comprises:
- identifying a range from the analytics data associated with the particular type of user action performed in connection with the network application that indicates how the network application metric is expected to perform relative to the particular type of user action during a period of time; and
- identifying values of network application metric that exists outside the identified range.

10. The non-transitory computer-readable medium as recited in claim 9, wherein calculating the statistical significance score for each of the plurality of the dimension elements comprises normalizing calculating Pearson Residuals.

11. The non-transitory computer-readable medium as recited in claim 8, wherein calculating a weighted confidence score for each audience segment based on the audience size and the percentage contribution comprises calculating weighted confidence scores according to the following equation: (a contribution score weight*average contribution score of the dimension elements in the unique, non-singular combination forming the audience segment)) +(intersection weight*percentage contribution)+(audience size weight*audience size).

12. The non-transitory computer-readable medium of claim 11, wherein the audience size weight is lower than both the contribution score weight and the intersection weight.

13. The non-transitory computer-readable medium of claim 8, wherein the network application is a website.

14. The non-transitory computer-readable medium as recited in claim 8, wherein updating the portion of the interactive display to include a display of the ordered audience segments comprises providing a top number of the ordered audience segments within the portion of the interactive display.

15. The non-transitory computer-readable medium as recited in claim 14, further comprising instructions, that when executed by the at least one processor, further cause the computer system to:
  receive a user selection of one of the top number of ordered audience segments from within the portion of the interactive display; and
  configure an audience segment report based on the selected audience segment that identifies an audience of users associated with the selected audience segment.

16. A system comprising:
  at least one processor; and
  at least one non-transitory computer-readable storage medium storing instructions thereon that, when executed by the at least one processor, cause the system to:
    identify an anomaly of a network application metric indicating a particular type of user action performed by users in connection with a network application by analyzing analytics data associated with the network application, wherein the network application metric indicating a particular type of user action comprises at least one of: web page lands, video completes, link clicks, generated revenue, number of units sold, number of prior visits by visitors, number of clicks by visitors, number of logins, or length of visit;
    identify a plurality of dimension elements that contributed to the anomaly of the network application metric, the plurality of dimension elements comprising actions other than the particular type of user action that lead to the anomaly of the network application metric, wherein each of the plurality of dimension elements falls within a dimension comprising one or more of: a country of a visitor associated with the network application, demographics corresponding to a visitor associated with the network application, a browser type used by a visitor associated with the network application, an operating system used by a visitor when accessing the network application, referring websites, or geographic information corresponding to a visitor associated with the network application;
    determine a statistical significance of each of the plurality of dimension elements that contributed to the anomaly of the network application metric by:
      calculating a statistical significance score for each of the plurality of the dimension elements that indicates the statistical significance of each of the plurality of the dimension elements, and
      normalizing the statistical significance score for each of the plurality of the dimension elements such that all the calculated statistical significance scores all reside within a comparable range;
    generate unique, non-singular combinations of a top threshold number of the identified dimension elements that contributed to the anomaly of the networking application metric;
    generate an audience segment for each of the unique, non-singular combinations of the top threshold number of the identified dimension elements, wherein each audience segment comprises a group of users who performed the actions represented by an intersection of the dimension elements in the respective unique, non-singular combination of the top threshold number of the identified dimension elements that contributed to the anomaly of the network application metric; and
    updating a portion of an interactive display associated with the network application to include a display of the generated audience segments of users that contributed to the identified anomaly of the network application metric.

17. The system as recited in claim 16, wherein generating audience segment for each of the unique, non-singular combinations of the top threshold number of the identified dimension elements comprises:
  identifying dimension elements in the plurality of dimension elements with normalized statistical significance scores that are within the top threshold number of normalized statistical significance scores;
  generating the unique, non-singular combinations of the identified dimension elements with normalized statistical significance scores that are within a top threshold number of normalized statistical significance scores; and
  identifying users who performed the actions represented by each unique, non-singular combination of the identified dimension elements with normalized statistical significance scores that are within the top threshold number of normalized statistical significance scores.

18. The system as recited in claim 17, further comprising instructions, that when executed by the at least one processor, cause the system to:
  rank the generated audience segments to identify an audience of users who performed the actions that contributed most significantly to the anomaly of the network application metric by:
    determining a user audience size associated with each audience segment;
    identifying a percentage contribution associated with each audience segment based on the normalized statistical significance scores of the associated dimension elements that represents how each audience segment contributed to the anomaly of the network application metric;
    for each audience segment, calculating a weighted confidence score based on the user audience size and the percentage contribution; and
    ordering the audience segments based on the weighted confidence scores.

19. The system as recited in claim 17, further comprising instructions, that when executed by the at least one processor, further cause the system to identify an anomaly of a network application metric indicating a particular type of user action performed by users in connection with a network application by:
  identifying a range from the analytics data associated with the particular type of user action performed in connection with the network application that indicates how the network application metric is expected to perform relative to the particular type of user action during a period of time; and identifying a value of network application metric that exists outside the identified range.

20. The system as recited in claim 17, further comprising instructions, that when executed by the at least one processor, cause the system to:

receive a user selection of one of the top number of ordered audience segments from within the portion of the interactive display; and configure an audience segment report based on the selected audience segment that identifies the audience of users associated with the selected audience segment.

* * * * *